United States Patent [19]
Kolawa et al.

[11] Patent Number: 6,085,029
[45] Date of Patent: Jul. 4, 2000

[54] METHOD USING A COMPUTER FOR AUTOMATICALLY INSTRUMENTING A COMPUTER PROGRAM FOR DYNAMIC DEBUGGING

[75] Inventors: Adam K. Kolawa, Sierra Madre, Calif.; Roman Salvador, Barcelona, Spain; Wendell T. Hicken, Whittier; Bryan R. Strickland, Los Angeles, both of Calif.

[73] Assignee: Parasoft Corporation, Monrovia, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/701,097

[22] Filed: Aug. 21, 1996

Related U.S. Application Data

[63] Continuation of application No. 08/435,759, May 9, 1995, Pat. No. 5,581,696.

[51] Int. Cl.[7] .............................. G06F 11/00; G01R 31/28
[52] U.S. Cl. ...................... 395/183.14; 395/704; 395/708
[58] Field of Search ................................ 395/183.14, 500, 395/183.13, 183.01, 701–708; 364/267, 267.2, 267.91, 267.8, 268.1

[56] References Cited

U.S. PATENT DOCUMENTS

| | | | |
|---|---|---|---|
| 4,620,303 | 10/1986 | Tschoepe | 395/183.01 |
| 5,175,856 | 12/1992 | Van Dyke | 395/700 |
| 5,270,712 | 12/1993 | Iyer | 341/50 |
| 5,371,747 | 12/1994 | Brooks et al. | 395/183.14 |
| 5,450,586 | 9/1995 | Kuzara | 395/700 |
| 5,465,321 | 11/1995 | Smyth | 706/20 |
| 5,475,588 | 12/1995 | Schabes | 364/419.08 |
| 5,493,678 | 2/1996 | Arcuri | 395/600 |
| 5,581,697 | 12/1996 | Gramlich | 395/183.11 |
| 5,583,988 | 12/1996 | Crank | 395/185.01 |
| 5,590,329 | 12/1996 | Goodnow, II | 395/708 |
| 5,671,416 | 9/1997 | Elson | 395/702 |
| 5,680,622 | 10/1997 | Even | 395/709 |

*Primary Examiner*—Dieu-Minh T. Le
*Attorney, Agent, or Firm*—Christie, Parker & Hale, LLP

[57] ABSTRACT

A method for automatically instrumenting a computer program for dynamic debugging. Such a computer program comprising source code written in a programming language for executing instructions on the computer. The source code is provided as a sequence of statements in a storage device to the computer. Each of the statements are separated into tokens representing either an operator or at least one operand. A parse tree is built according to a set of rules using the set of tokens. The parse tree is instrumented to create an instrumented parse tree for indicating that an error condition occurred in the computer program during execution. Object code is generated from the instrumented parse tree and stored in a secondary storage device for later execution using an error-checking engine that indicates error conditions present in the computer program.

50 Claims, 32 Drawing Sheets

Microfiche Appendix Included
(17 Microfiche, 1585 Pages)

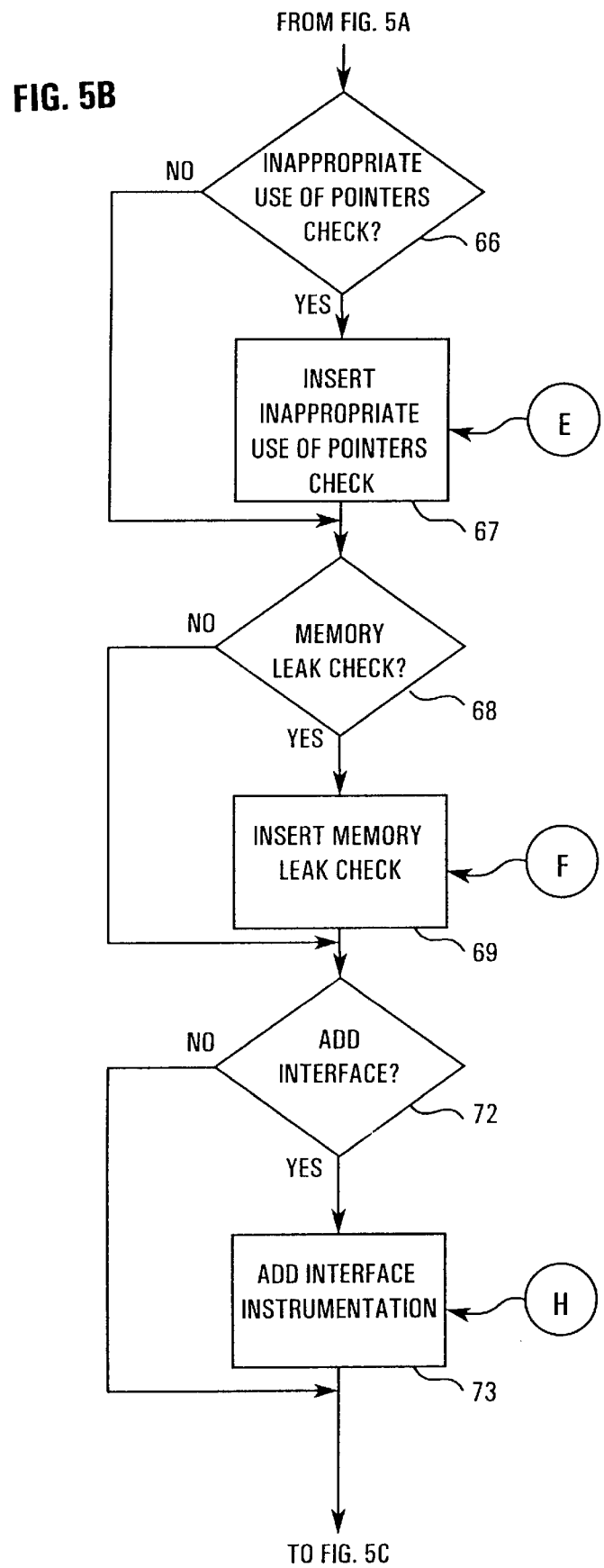

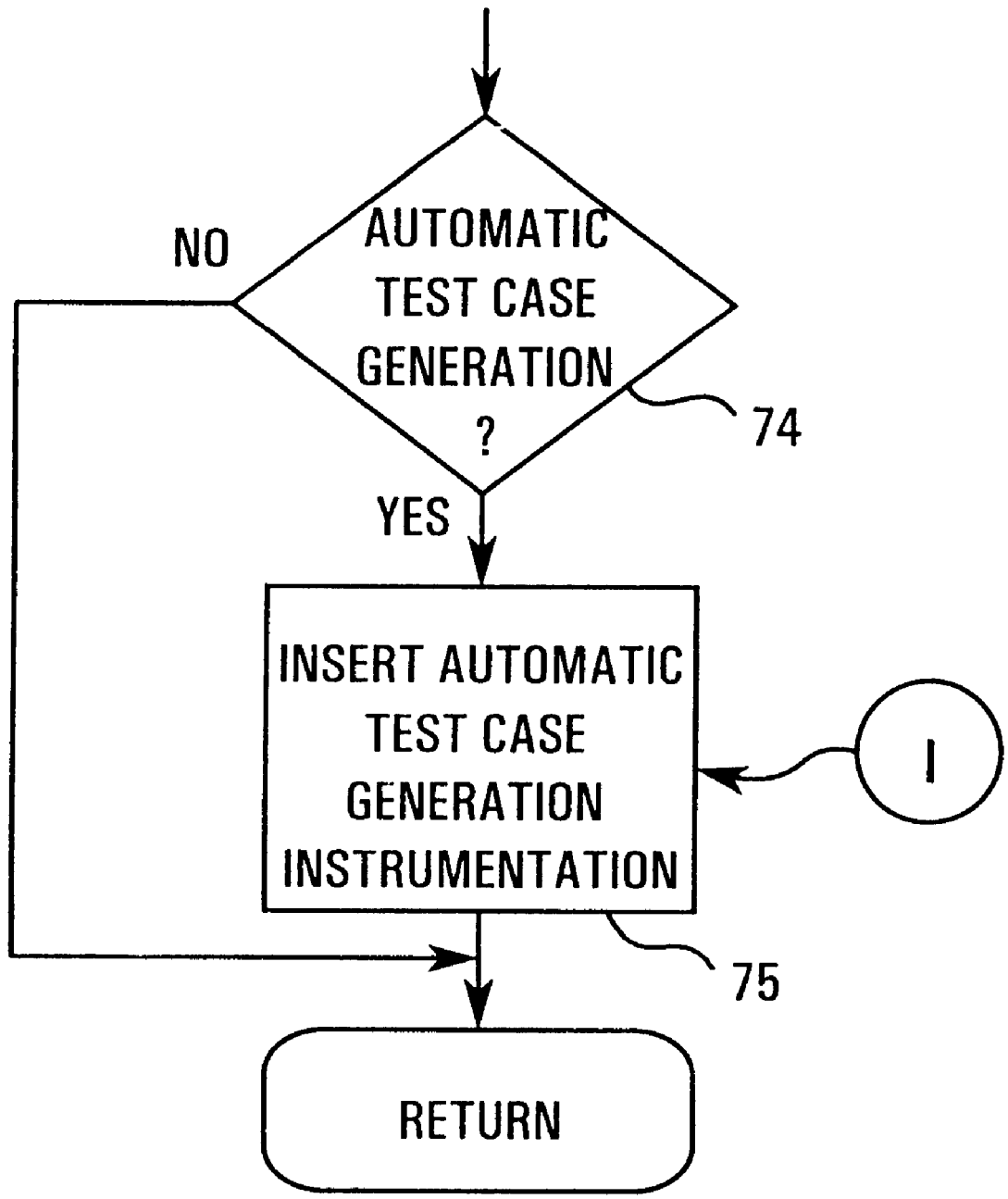

FIG.6

```
1 int main()
2 {
3   int a, i;
4   a=i;
5   return 0;
6 }
```

FIG.10

```
1 int main()
2 {
3   int i, A[10];
4   for (i=1; i<=10; i++) {
5     A[i]=0;
6   }
7   return 0;
8 }
```

FIG.14

```
1 int main()
2 {
3   char *ptr;
4   ptr=malloc(10);
5   ptr++;
6   free(ptr);
7   return 0;
8 }
```

FIG.19

```
1 long a, b, (*foo) ();
2 foo= (long (*) ())&a;
3 b= foo();
```

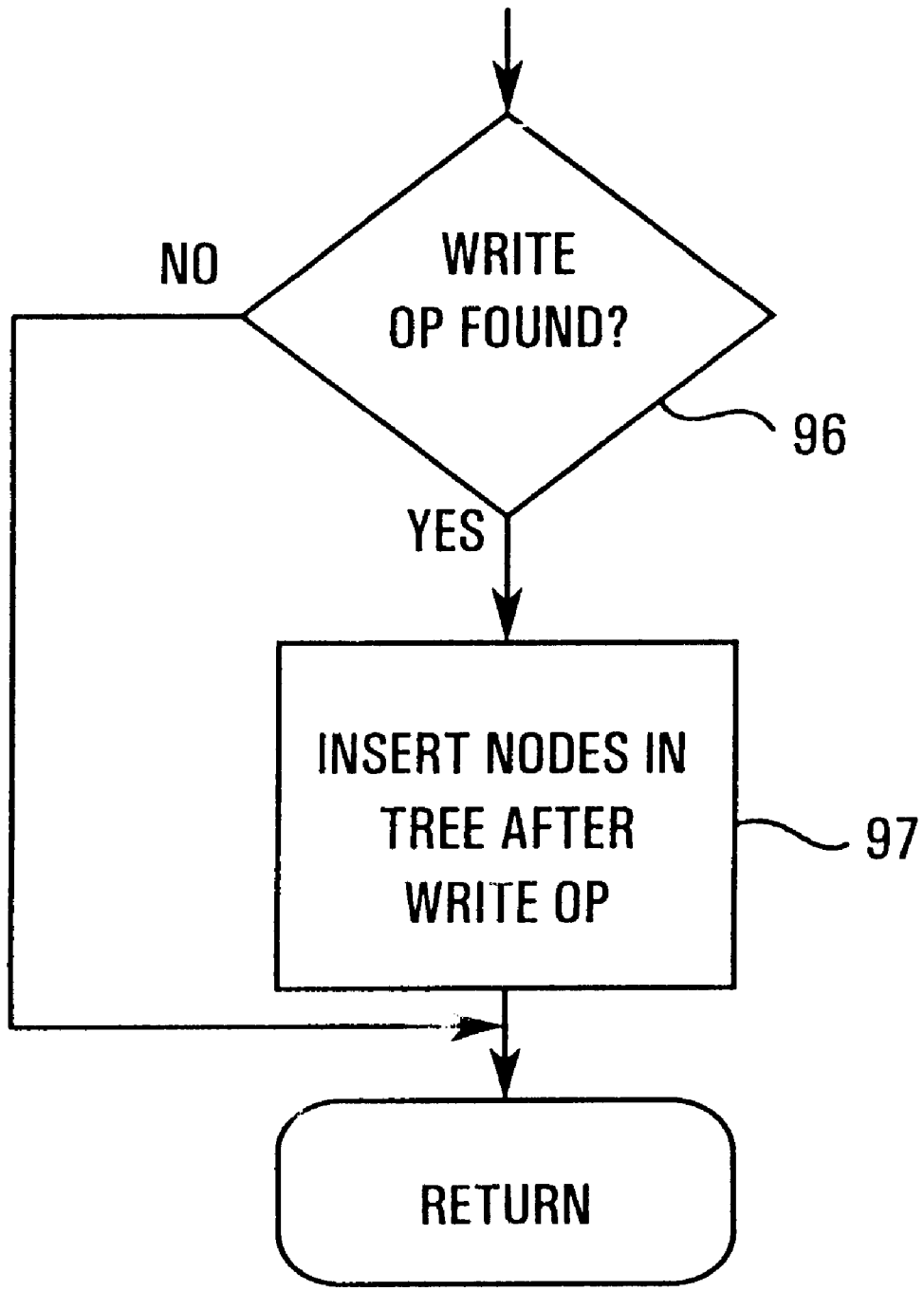

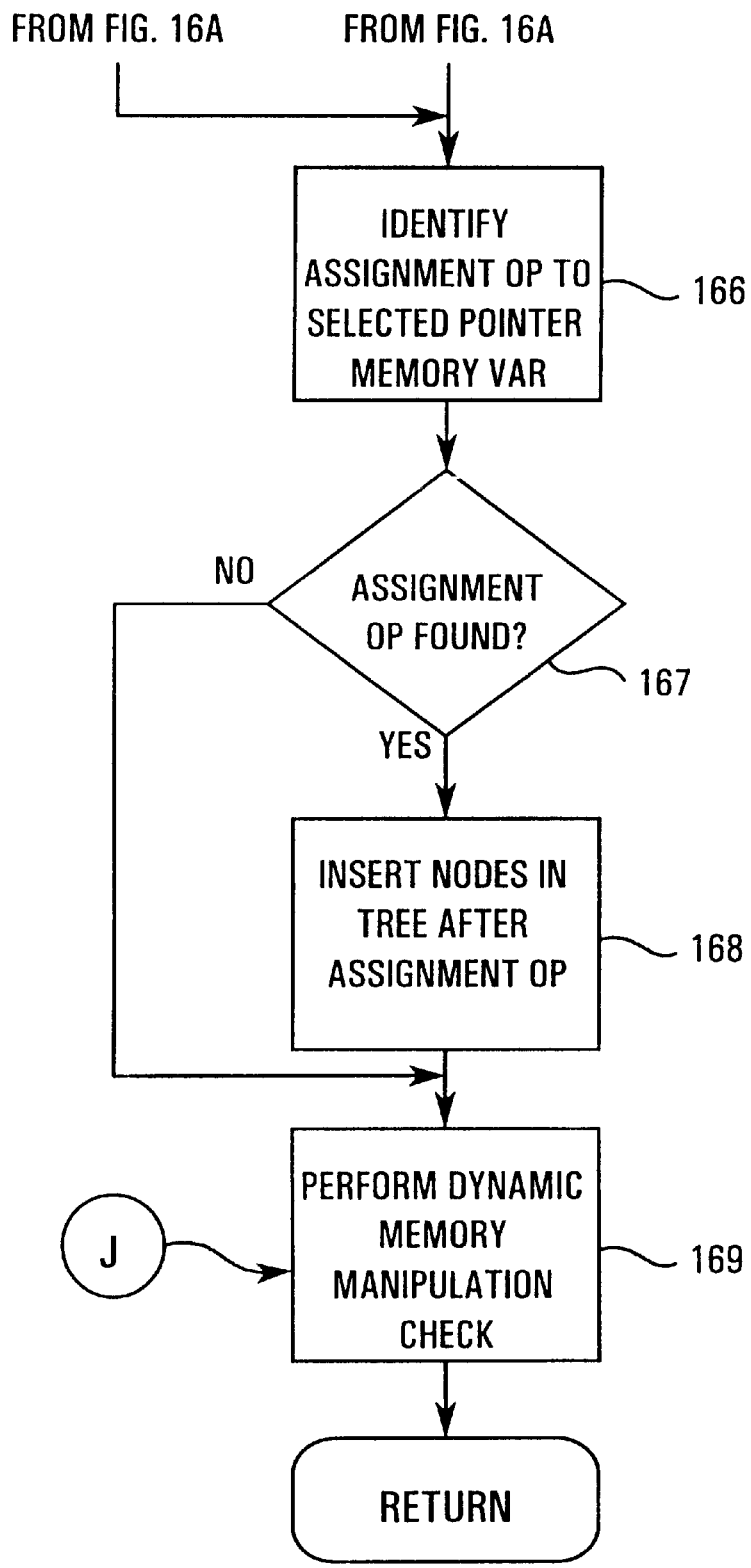

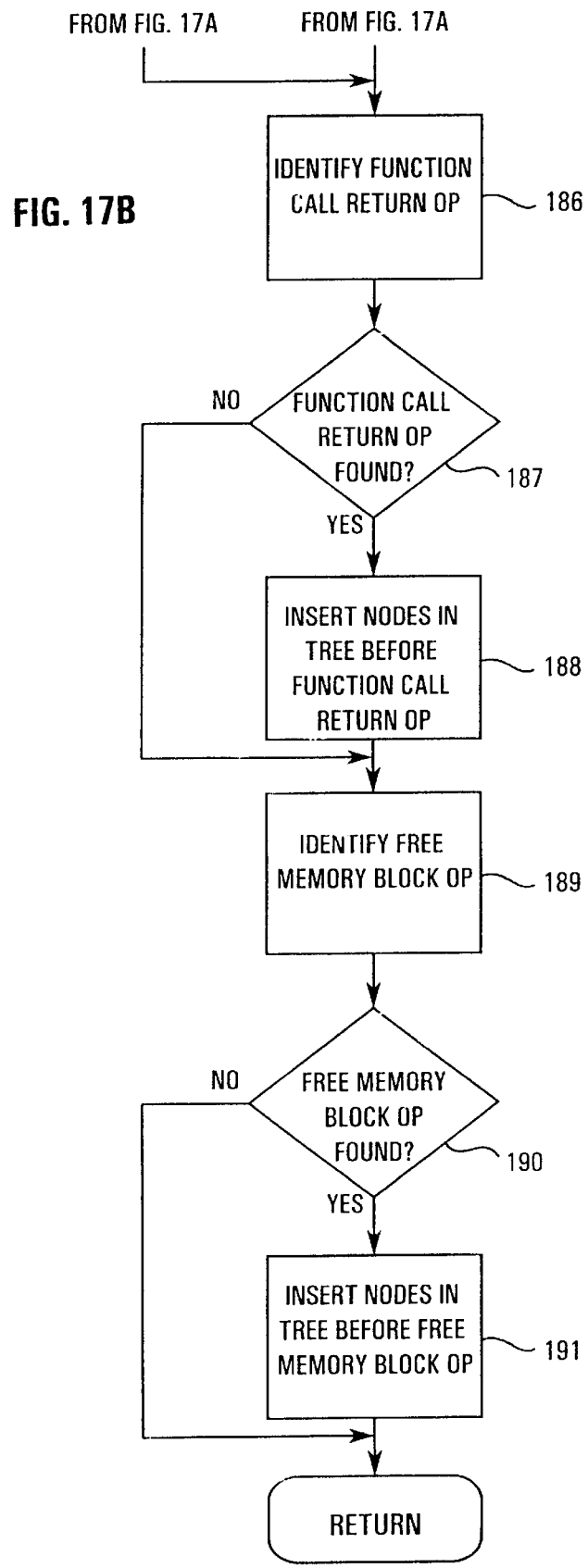

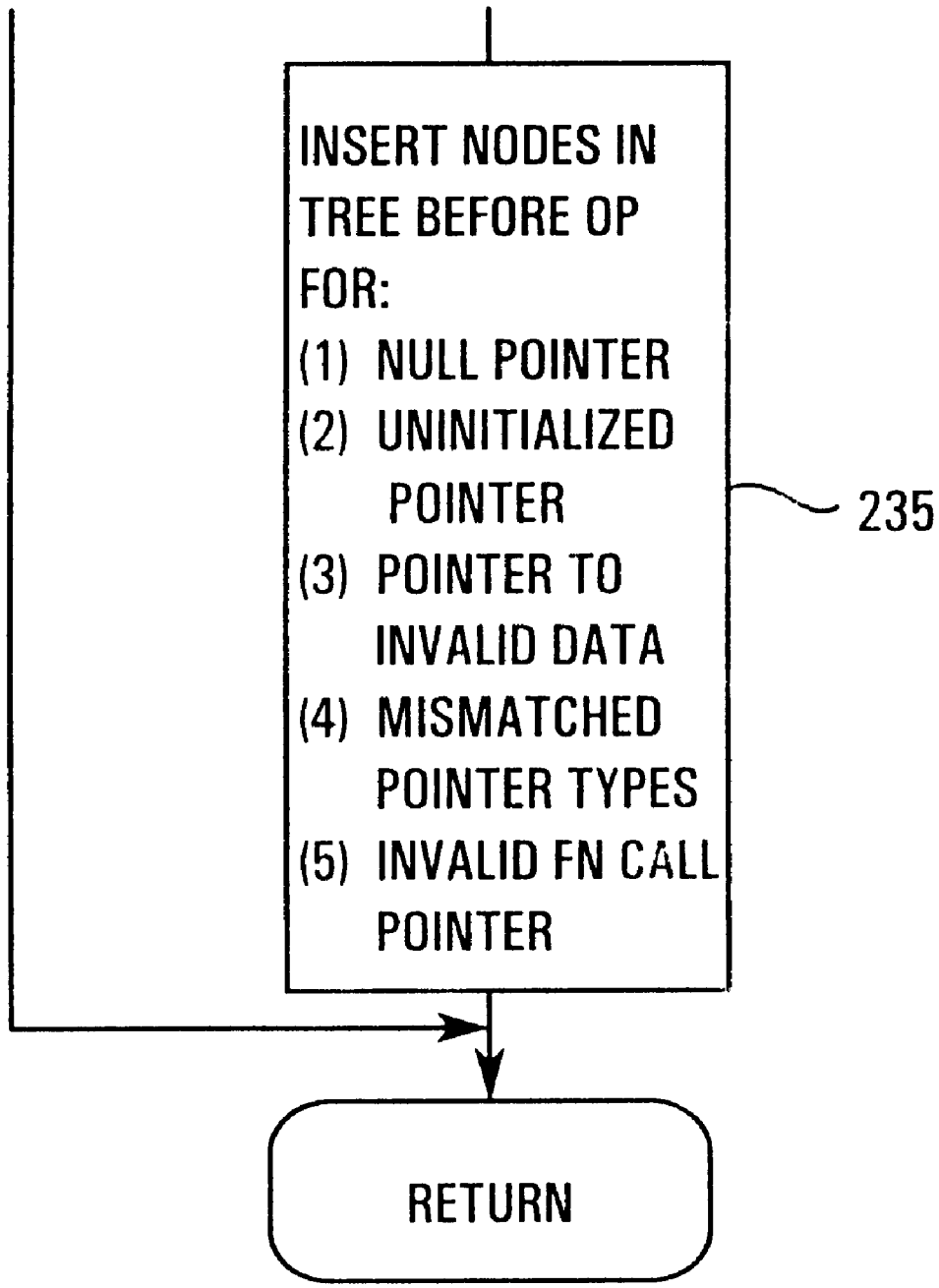

FIG.23

```
1 void foo()
2 {
3    char *ptr=malloc(10);
4    return;
5 }
```

FIG.27A

```
1 ptr=malloc(10);
```

FIG.27B

```
1  char * malloc(size_t size)
2  {
3    char *a;
4    if (size <=0)
5      iic_error("Bad malloc size");
6    a=malloc(size);
7    if (a)
8      iic_alloc(a, size);
9    else
10     iic_error("malloc failed");
11   return a;
12 }
```

FIG.31

```
1 void foo()
2 {
3    char b, c, *ptr;
4    c=getchar();
5    if (c < '0' || c > '9') {
6      *ptr=0;
7    }
8    b=c - '0';
9 }
```

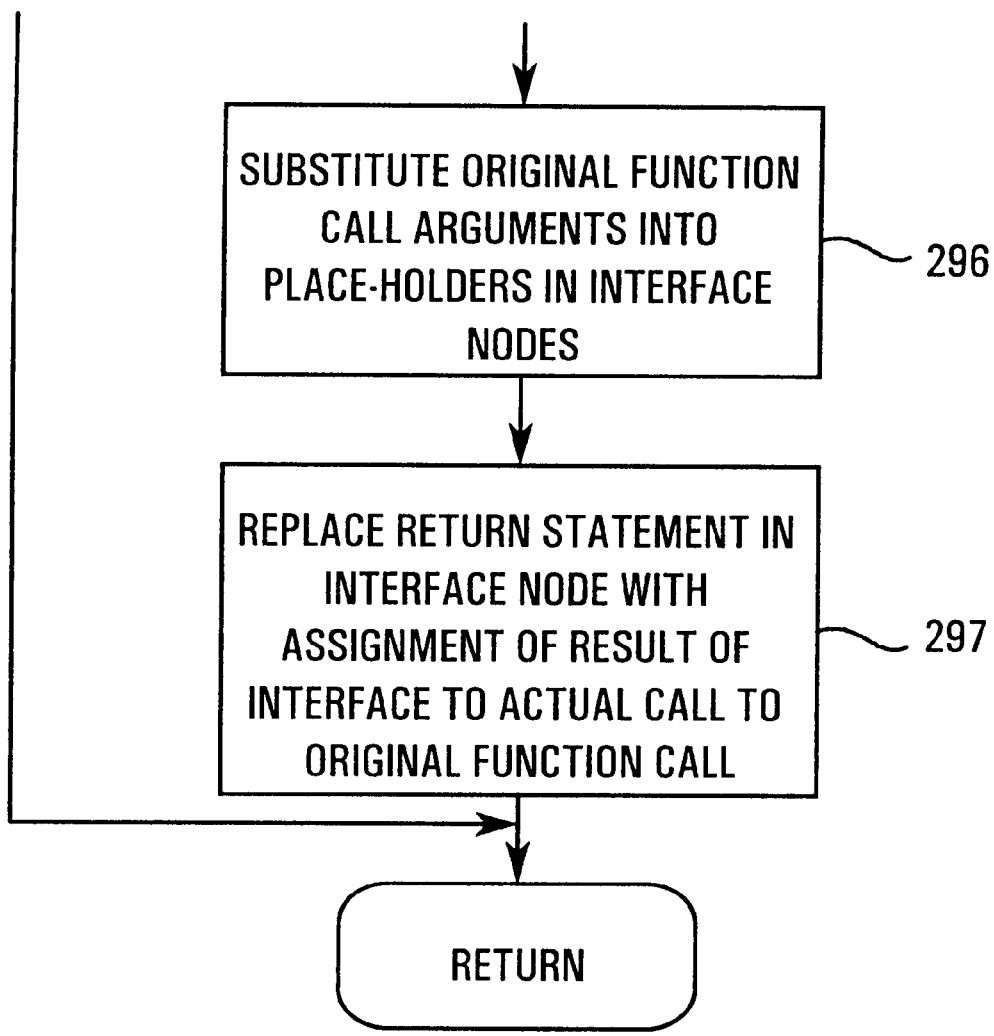

METHOD USING A COMPUTER FOR AUTOMATICALLY INSTRUMENTING A COMPUTER PROGRAM FOR DYNAMIC DEBUGGING

CROSS-REFERENCE TO RELATED APPLICATION

This is a continuation of application Ser. No. 08/435,759 filed May 9, 1995 now U.S. Pat. No. 5,581,696.

Reference to Microfiche Appendix and Printed Appendices

A microfiche appendix is part of the specification which includes 17 microfiche and 1585 frames.

In addition, two printed documents are part of the specification and are included as 28-page Appendix A and 17-page Appendix B. Two computer source code listings are also part of this specification and are included as 14-page Appendix C and 3-page Appendix D.

A portion of the disclosure of this patent document contains material to which a claim of copyright is made. The copyright owner has no objection to the facsimile reproduction by anyone of the patent document or patent disclosure, as it appears in the Patent and Trademark Office patent file or records, but reserves all other copyright rights whatsoever.

FIELD OF THE INVENTION

The present invention relates in general to automatic instrumentation methods for computer programs and in particular to automatic instrumentation methods for debugging of a computer program using a compiler parse tree.

BACKGROUND OF THE INVENTION

Typically, computer programs are developed in a cycle of writing, compiling, executing, debugging and rewriting computer code until a satisfactory program is attained. Two types of debugging can be performed: static debugging whereby the source code comprising the computer program is analyzed and corrected for errors prior to program execution, and dynamic debugging whereby runtime errors are detected by observing the behavior of the program during execution.

A computer program can be dynamically debugged by employing a separate program or device to observe the behavior of the target computer program by monitoring memory locations. A computer program can also be dynamically debugged internally by introducing debug statements or routines into the program and observing the results during program execution. These statements can be manually introduced into the source code during the writing stage of program development. They can also be automatically introduced by a separate program at some stage in the development cycle prior to execution. The automatic introduction of debug statements or routines is known as instrumentation.

Instrumentation can be used to perform tasks useful to debugging and analyzing a computer program. These include: analyzing code coverage to determine how often each program statement is executed and how long it takes to run; analyzing variables to determine what values are taken on and how often different parts of memory are accessed; analyzing program characteristics, such as memory usage and which functions are called using which parameters; and analyzing the correct use of program code by checking various assertions that ensure that what the program is doing actually makes sense. In addition to the tasks listed above, instrumentation can be used to automatically generate test cases for dynamically testing the program. Test case data for program inputs can be generated automatically by the instrumentation which then links to a test harness program to repeatedly execute the program with different inputs.

Instrumentation can be automatically built into a computer program in a number of ways. First, instrumentation can be introduced before compilation by manipulating the source code and introducing instrumentation routines at appropriate locations. A problem with this approach is that it is slow and inefficient for large or highly complex programs.

Instrumentation can also be automatically introduced after compilation but before link editing by analyzing the relocatable object code output by the compiler. A problem with this approach is that the broader context of the target program is lost to the earlier stages of compilation. Consequently, the introduction of instrumentation must be limited to an analysis of memory locations and address pointers.

Finally, instrumentation can be automatically introduced after link editing by manipulating the executable program. This approach suffers from the same problems as with relocatable object code.

A further problem with these approaches is that the automatic introduction of instrumentation constitutes an extra stage in the program development cycle. Consequently, there is a need for a method of automatically instrumenting a computer program for dynamic debugging as an integral part of the program development cycle and without introducing an extra stage.

SUMMARY OF THE INVENTION

The present invention overcomes the above problems and pertains to a method for automatically instrumenting a computer program for dynamic debugging. More specifically, such a computer program constitutes source code written in a programming language for executing instructions on a computer. The programming language has a grammar comprising operations having an operator and at least one operand and a set of rules for relating each such operator to its respective operand(s). The method consists of the steps of providing the source code as a sequence of statements in a storage device to the computer. Each of the statements are separated into tokens representing either an operator or at least one operand.

A parse tree is built according to the set of rules using the set of tokens whereby the parse tree is a directed acyclic graph and constitutes a plurality of nodes connected by paths organized into a hierarchy of parent nodes representing operators connected to children nodes representing operands of the operators. The parse tree contains embedded error detection statements for communicating information to a runtime error-checking facility which can test for and indicate error conditions as they occur. The parse tree is instrumented to create an instrumented parse tree for indicating that an error condition occurred in the computer program during execution. Object code is generated from the instrumented parse tree and stored in a secondary storage device for later execution using an error-checking engine that indicates error conditions present in the computer program.

BRIEF DESCRIPTION OF THE DRAWINGS

The above and further advantages of this invention may be better understood by reference to the following detailed description taken in conjunction with the accompanying drawings in which:

FIGS. 5A, 5B and 5C are a flow chart of a routine for determining the instrumentation to augment a parse tree;

FIG. 6 is a source code listing of a computer program containing an uninitialized read of a memory variable;

FIGS. 8A and 8B are a flow chart for a routine for detecting an uninitialized read of a program variable error condition;

FIG. 10 is a source code listing of a computer program containing a write operation to an invalid memory address;

FIG. 14 is a source code listing of a computer program containing a dynamic memory manipulation error using a pointer memory variable;

FIGS. 16A and 16B are a flow chart of a routine for detecting a dynamic memory manipulation error using a pointer memory variable error condition;

FIGS. 17A and 17B are a flow chart of a routine for performing a dynamic memory manipulation check;

FIG. 19 is a source code listing of a program segment containing an inappropriate use of a pointer memory variable;

FIGS. 21A and 21B are a flow chart of a routine for detecting an inappropriate use of a pointer memory variable error condition;

FIG. 23 is a source code listing of a computer function containing a memory leak error;

FIG. 27A is a computer function to be instrumented with an interface and FIG. 27B is the interface routine;

FIGS. 29A and 29B are a flow chart of a routine for inserting an interface;

FIG. 31 is a source code listing of a computer function to be instrumented for automatic test case generation;

DETAILED DESCRIPTION OF THE PREFERRED EMBODIMENT

Figure 1:
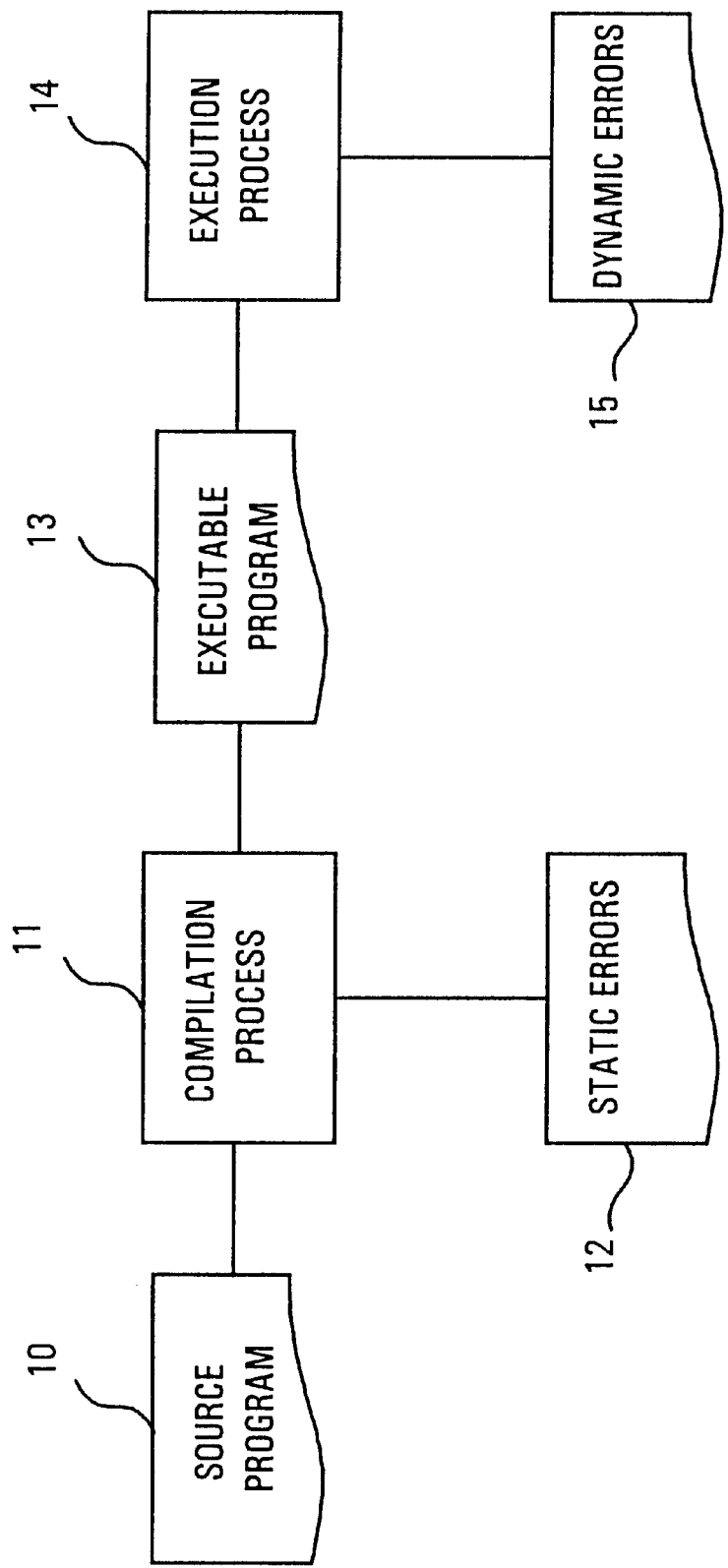
FIG. 1 is a block diagram of a process for creating and debugging a computer program.

A block diagram of a process for creating and debugging a computer program is shown in FIG. 1. A source program 10 comprising source code written in a programming language for executing instructions on a computer system is translated into an executable program 13 through a compilation process 11. The source program is translated into an equivalent program that can be run on a target computer system. The compilation process can involve compiling, interpreting or a similar translation of the source program.

The compilation process also reports to the user the presence of static errors 10 in the source program due to errors in lexicography, syntax and semantics. For instance, a string of characters can fail to form a token recognized by the programming language (lexicographic error). Or, a set of tokens may violate a structure rule that the parser is unable to construct into a branch of a parse tree syntactic error). Or, a proper syntactic structure can be semantically incorrect because it fails to have any meaning with respect to the operation involved (semantic error).

After the static errors are resolved, the program is further evaluated during the execution process 14 which detects dynamic errors 15 based on the runtime attributes of program operation. Dynamic errors are difficult to detect since they stem from logical or conceptual errors in the drafting of the source program rather than the concrete static errors resulting from an improper expression of the program. To detect dynamic errors, the program must be instrumented with debug routines during some phase of the compilation process whereby messages indicating the presence of a dynamic error are generated for evaluation by the user.

Figure 2:
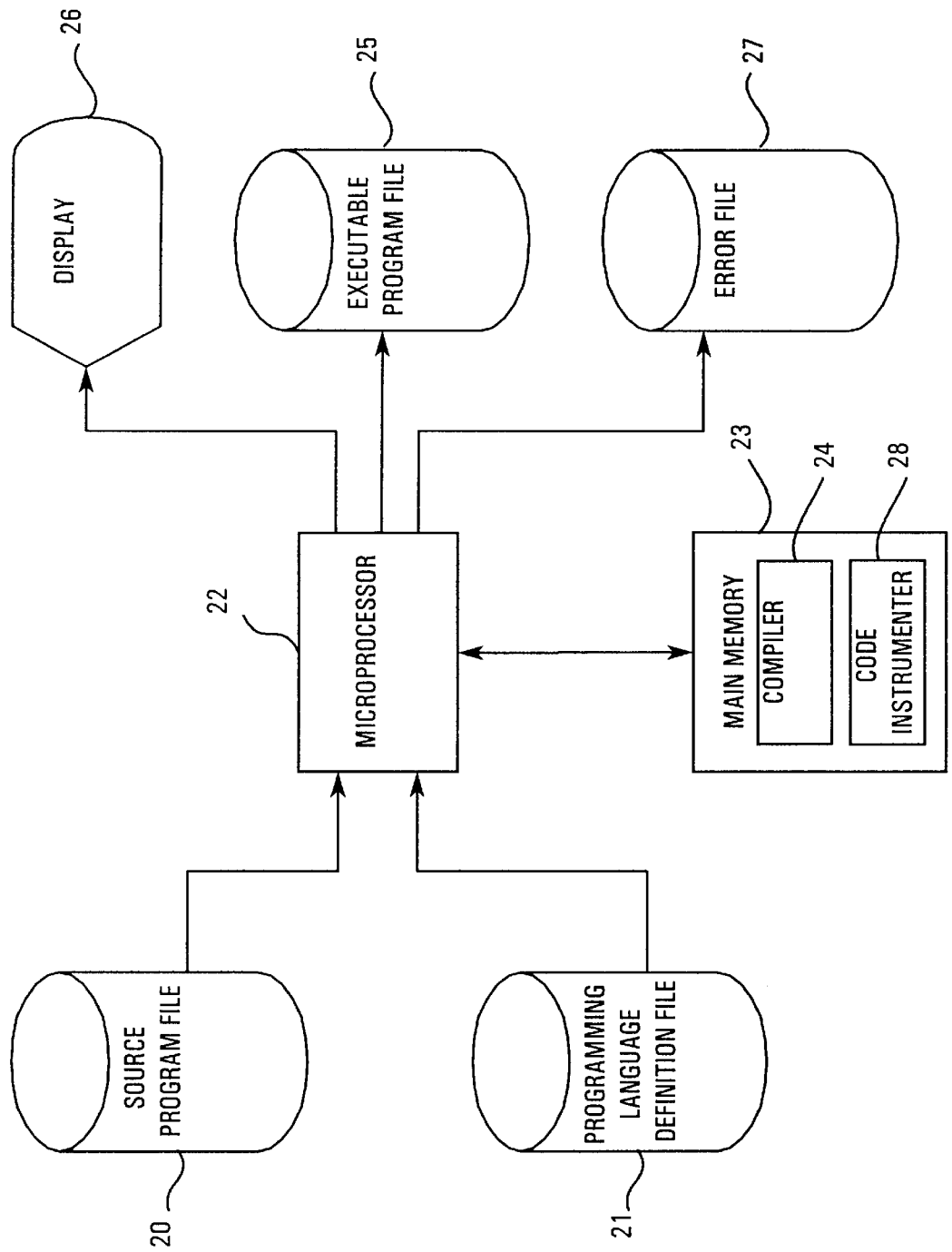
FIG. 2 is a schematic diagram of a computer system for performing a method for automatically instrumenting a computer program for dynamic debugging according to the present invention.

A schematic diagram of a computer system for performing a method for automatically instrumenting a computer program for dynamic debugging according to the present invention is shown in FIG. 2. A main memory 23 contains a compiler 24 in the form of a computer program for carrying out the steps of compiling and a code instrumenter 28 for automatically instrumenting a computer program. A microprocessor 22 runs the compiler using the source program file 20, which contains the source program 10, and the programming language definition file 21, which contains a grammar comprising operations and a set of rules. The microprocessor runs the compiler and creates an executable program file 25, which contains the instrumented executable program 13 in the form of object code.

During the execution of the compiler 24, an error may arise due to some problem with the source program. Error messages are presented to the user on a display 26 and collected and stored in an error file 27.

Source code listings for a computer program for use in one embodiment of the present invention are included in the microfiche appendix. The source code is written in C language. A description of the C language is detailed in B. W. Kernighan & D. M. Ritchie, *The C Programming Language*, Prentice Hall (2d Ed. 1988), the disclosure of which is hereby incorporated by reference.

The computer program of the microfiche appendix is preferably run on a Sun Microsystems SPARCstation 20 workstation running the Unix operating system. The source code listings are compiled using the instructions contained in Appendix D, the disclosure of which is hereby incorporated by reference. The resulting program is executed. Preferably, the workstation is equipped with 64 megabytes of random access memory and 4 gigabytes of secondary storage space.

Figure 3:
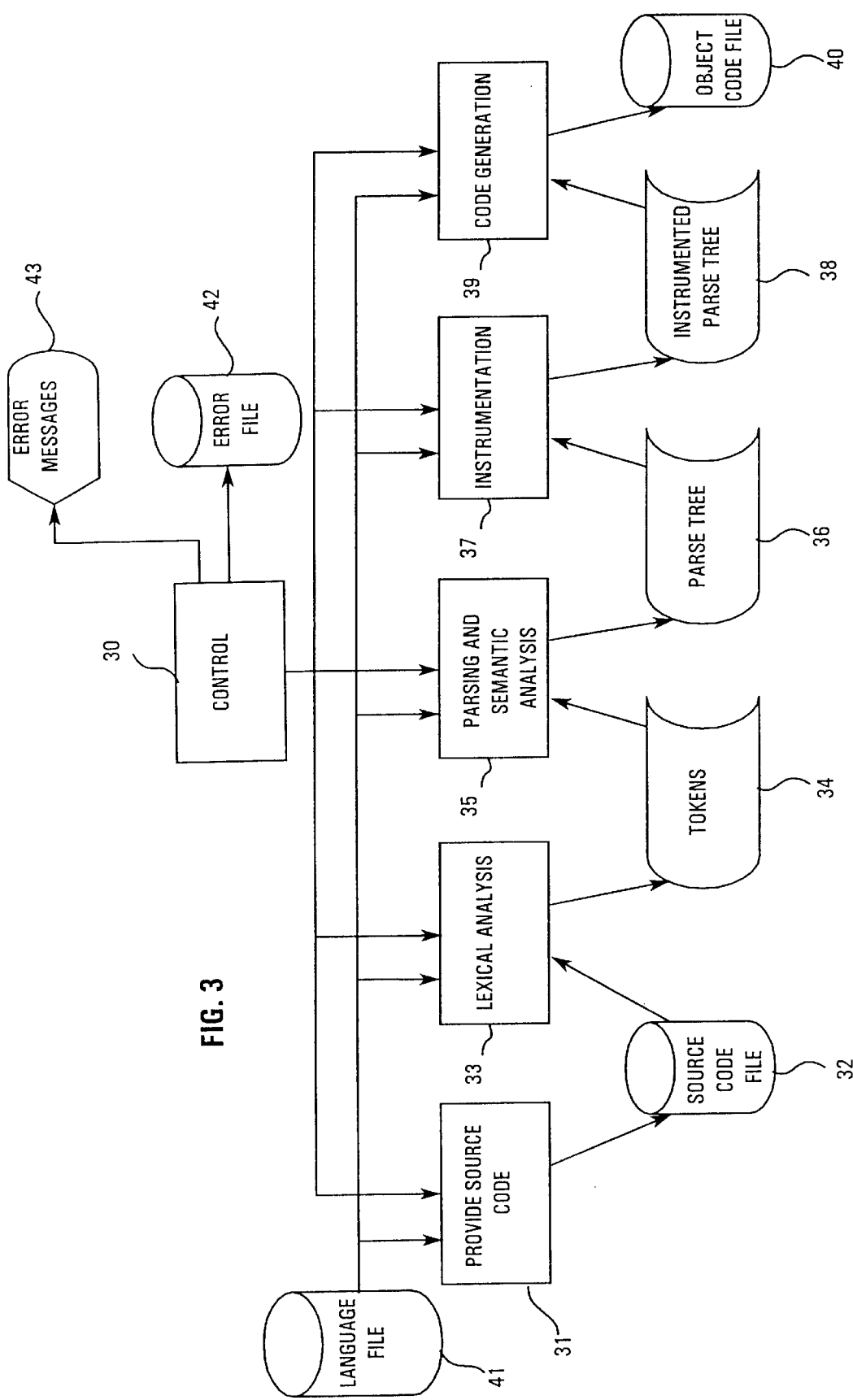
FIG. 3 is a software block and schematic diagram for a method for automatically instrumenting a computer program for dynamic debugging.

A software block and schematic diagram for a method for automatically instrumenting a computer program for dynamic debugging according to the present invention is shown in FIG. 3. One embodiment of the present invention is described in "Compiler Intermediate Code Insertion for Automatic Debugging and Test Case Generation," which is attached as Appendix A, the subject matter of which is hereby incorporated by reference as if set forth in full. The method uses a computer program consisting of five main components coordinated by a main control component 30. The source code component 31 reads a source code file 32 stored in a secondary storage device and provides it to the computer program.

A lexical analysis component 33 separates the sequence of statements making up the source code in to tokens 34 by scanning the characters comprising each statement and grouping the characters into tokens. Each token has a collective meaning in the context of the grammar defining the programming language that the source program is written in. In most programming languages, key words, operators, identifiers, constants, literal strings, and punctuation symbols (such as parentheses, commas and semicolons) are treated as tokens. The tokens 34 are stored in the main memory.

A parsing and semantic analysis component 35 groups the tokens into grammatical phrases that are used to represent the instructions to be performed by the source program. These grammatical phrases are represented by a parse tree 36, which is stored in main memory.

The parse tree describes the syntactic structure of the source program. A description of the data structures used for representing a parse tree in one embodiment of the present invention is attached as Appendix C and the subject matter of which is hereby incorporated by reference. It is a hierarchical representation of the instructions making up the program structured as a directed acyclic graph comprising a hierarchy of parent and children nodes interconnected by paths with a root node representing the program's entry point. The blueprint for creating a parse tree is provided by the rules of the programming language grammar. Each path connecting a parent node to a child node represents a relationship between an operator and its operands. A single instruction can comprise several operations and each such operation becomes a node in the parse tree. Operations can be defined recursively whereby an operation constitutes an operand for another operation.

An instrumentation component 37 reads the stored parse tree and augments the parse tree with instrumentation for use in dynamic debugging. The details of the instrumentation component are described in more detail below. It generates an instrumented parse tree 38. In a preferred embodiment of the present invention, eight categories of instrumentation are used. These include detecting a read operation to an uninitialized memory variable, detecting a read or write operation to an invalid memory address for a complex memory variable, detecting a dynamic memory manipulation error using a pointer memory variable, detecting an inappropriate use of a pointer memory variable, detecting a memory leak error, and detecting a function call argument error. These also include a user definable instrumentation routine known as an interface and an automatic test case generation routine.

For each category, an analysis is performed to determine which check or operation is appropriate and instrumentation is embedded into the parse tree. Some categories require instrumentation to be introduced in several locations in the parse tree. The result is an instrumented parse tree, which is stored in main memory.

A code generation component 39 reads the instrumented parse tree and generates an object code file 40 with the instrumentation incorporated. This component is sometimes divided into an intermediate code generator, a code optimizer, and a code generator. The intermediate code generator transforms the instrumented parse tree into an intermediate representation representing a program for an abstract machine. This representation is useful for computing expressions, handling flow of control constructs and procedure calls. The code optimizer attempts to improve the performance of the intermediate code by decreasing the running time of the executable program. Finally, the code generator creates relocatable machine code or assembly code to be output as the object code file 40. Memory locations are selected for each variable used and the intermediate instructions are translated into a sequence of machine instructions that perform the same task. These are combined and output as object code.

Throughout the operation of each component shown in FIG. 3, reference is made to a language file 41 containing the definition of grammar rules for the programming language. Similarly, errors in the source program that are detected are output to the user through error messages 43 and error file 42.

Figure 4:
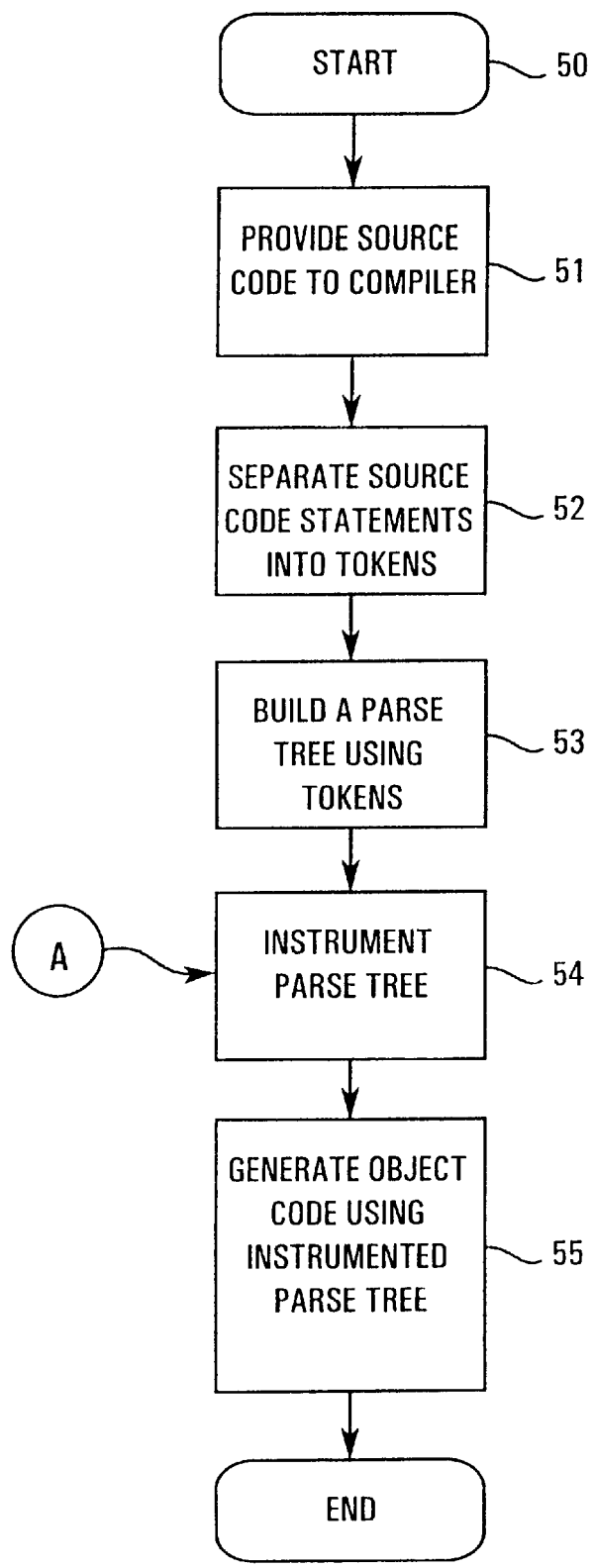
FIG. 4 is a flow chart of a preferred embodiment of the method according to the present invention.

A preferred embodiment of the compiler 24 is shown in FIG. 4. A file containing source code comprising the computer program to be instrumented is provided to the compiler (block 51). The source code is written in a programming language for executing instructions on a computer.

The programming language is defined by a grammar comprising operations having an operator (to identify the operation) and at least one operand (upon which the operation is performed). In addition, the grammar includes a set of rules for relating each of the operations to their respective operands. Preferably, the grammar is a context-free grammar having four components: a set of tokens, known as terminal symbols; a set of nonterminals; a set of productions, where each production consists of a nonterminal, an arrow, and a sequence of tokens and/or nonterminals; and a designation of one of the nonterminals as a start symbol. The productions define the set of operations comprising that grammar. Each production is structured with the nonterminal on its left side, followed by an arrow, followed by a sequence of tokens and/or nonterminals on its right side. A description of a context-free grammar is detailed in H. R. Lewis & C. H.

Papadimitriou, *Elements of the Theory of Computation*, Prentice-Hall (1981), the disclosure of which is hereby incorporated by reference.

Each separate source code statement is separated into tokens (block 52), each token representing a terminal symbol in the grammar. A token can be either an operator or an operand. In addition, source code comments and white space (comprising blanks, tabs and new line characters) are removed during this step.

The set of tokens is used to build a parse tree (block 53) that represents the structure of the program operations. The parse tree is structured with certain properties. This includes having a root node labeled by a start symbol, each node being labeled by a token or a null value, and each interior node being labeled with a nonterminal. For each nonterminal node, the children of that node correspond to the right-hand side of the production rule for the operation represented by the parent node. In addition to parse tree representations, other intermediate representations for organizing tokens are possible. The same approach presented herein applies to other intermediate representations as well.

Once completed, the parse tree is instrumented (block 54) to communicate runtime information to the error-checking engine to facilitate automatic detection of dynamic errors in the source program. This step requires a two-phase approach. During the first phase, the source code is analyzed using a flow analysis procedure to determine the type of instrumentation that is appropriate. During the second phase, the parse tree is augmented with additional nodes comprising the operations required to communicate runtime conditions to the error-checking engine which include appropriate checks for runtime or dynamic errors or programmatic anomalies to the error-checking engine in the form of debug output.

The instrumented parse tree is used to generate code for the target program which not only functions as was originally intended, but also contains calls to instrumentation procedures which provide automatic error detection of dynamic program errors as well as an ability to automatically generate test cases. This is accomplished by passing runtime information to the error-checking engine which is linked with the target program when the program executes.

The instrumented parse tree is used to generate object code (block 55), which is stored in a secondary storage device. The steps of separating source code into tokens (block 52), building a parse tree (block 53), and generating object code (block 55) are described in A. V. Aho et al., *Compilers, Principles, Techniques and Tools*, Addison-Wesley (1986), the disclosure of which is hereby incorporated by reference.

Figure 5A:
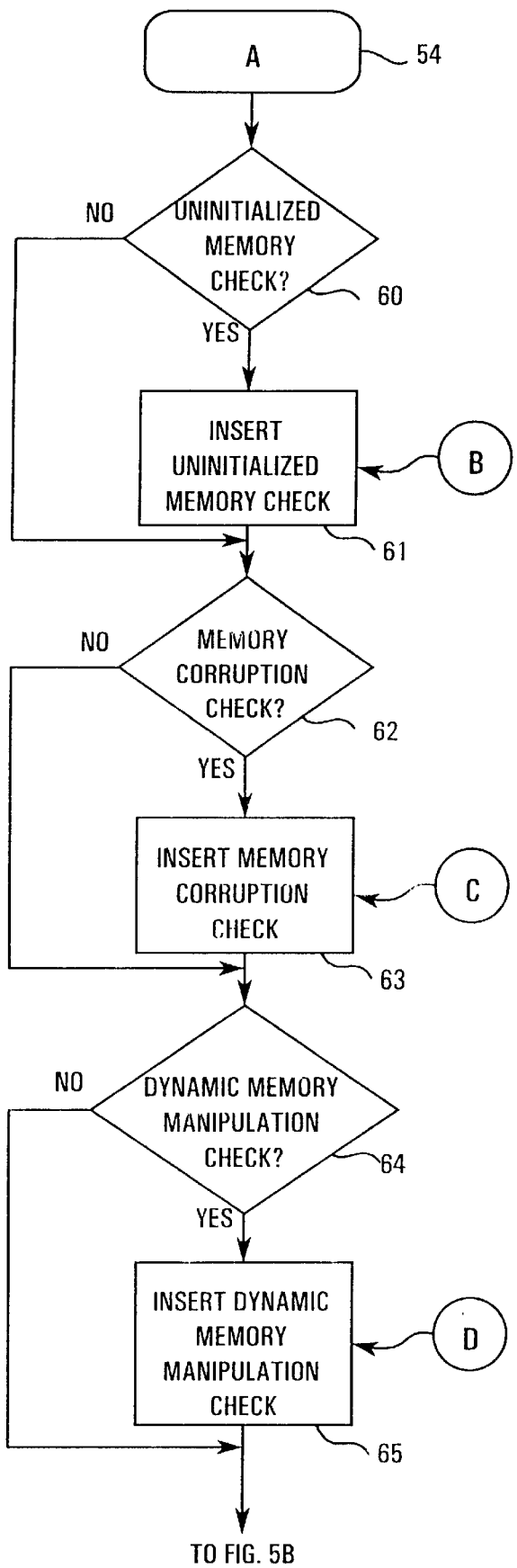

Referring to FIGS. 5A, 5B and 5C, a routine for instrumenting a parse tree according to the present invention is shown. A step-wise procedure is followed to insert each of the seven categories of instrumentation into the parse tree. Thus, nodes are inserted for detecting a read operation to an uninitialized memory variable (block 61), detecting a write operation to an invalid memory address for a complex memory variable (block 62), detecting a dynamic memory manipulation error using a pointer memory variable (block 65), detecting an inappropriate use of a pointer memory variable (block 67), detecting a memory leak error (block 69), inserting a user-defined instrumentation routine (interface) (block 73), and inserting an automatic test case generation routine (block 75).

The seven categories of instrumentation perform checks or augment the functionality of the original source code. In addition, other information is communicated to the error-checking engine through the instrumented code. This consists of declarations of variables and pointer addresses and their sizes, assignments of pointers, function entry and exit point indicators, and memory allocation indicators.

The first category of dynamic memory error is the use of uninitialized memory variables. This means that a memory variable is declared, but is not yet assigned a value before it is used by some other statement in the program. Referring to FIG. 6, a source code listing of a computer program containing an uninitialized read of a memory variable is shown. On line 3, an integer variable "i" is defined. On line 4, the variable "i" is read. Since variable "i" is uninitialized, a dynamic error occurs at runtime.

Figure 7:
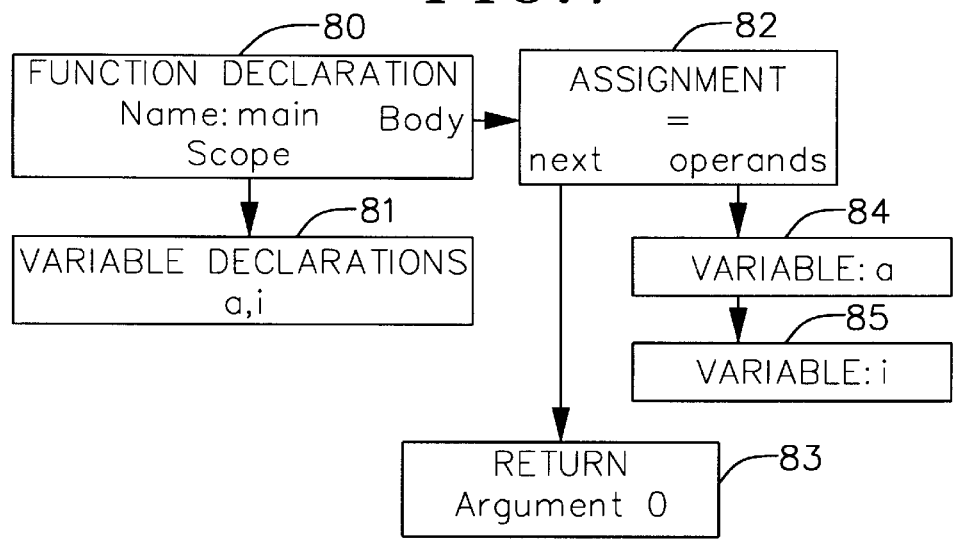
FIG. 7 is a diagram illustrating a parse tree representation of the source code listing in FIG. 6.

Referring to FIG. 7, a diagram illustrating a parse tree representation of the source code listing in FIG. 6 is shown. The function declaration (lines 1, 2 and 6) is represented by function declaration node 80. The declaration of variables "a" and "i" (line 3) is represented by variable declarations node 81. The assignment operation (line 4) is represented by assignment node 82 which is followed by return node 83 (corresponding to line 5). The assignment operation (line 4) has two operands, variables "a" and "i", represented respectively by variable nodes 84 and 85. To detect the use of the uninitialized memory variable "i" (line 4), the parse tree shown in FIG. 7 must be instrumented with debugging functionality so that the attempted assignment statement using variable "i" can be automatically detected by the error checking engine when the program is executed.

The overall criteria for inserting such an error check is as follows. If there is a memory variable used in a program expression that is not known to have been assigned a value previously, an error check is inserted into the parse tree to check that variable during execution. In addition, an error check is inserted to let the error-checking engine know that the variable at that particular address in memory is initially uninitialized at the start of execution.

Figure 8A:
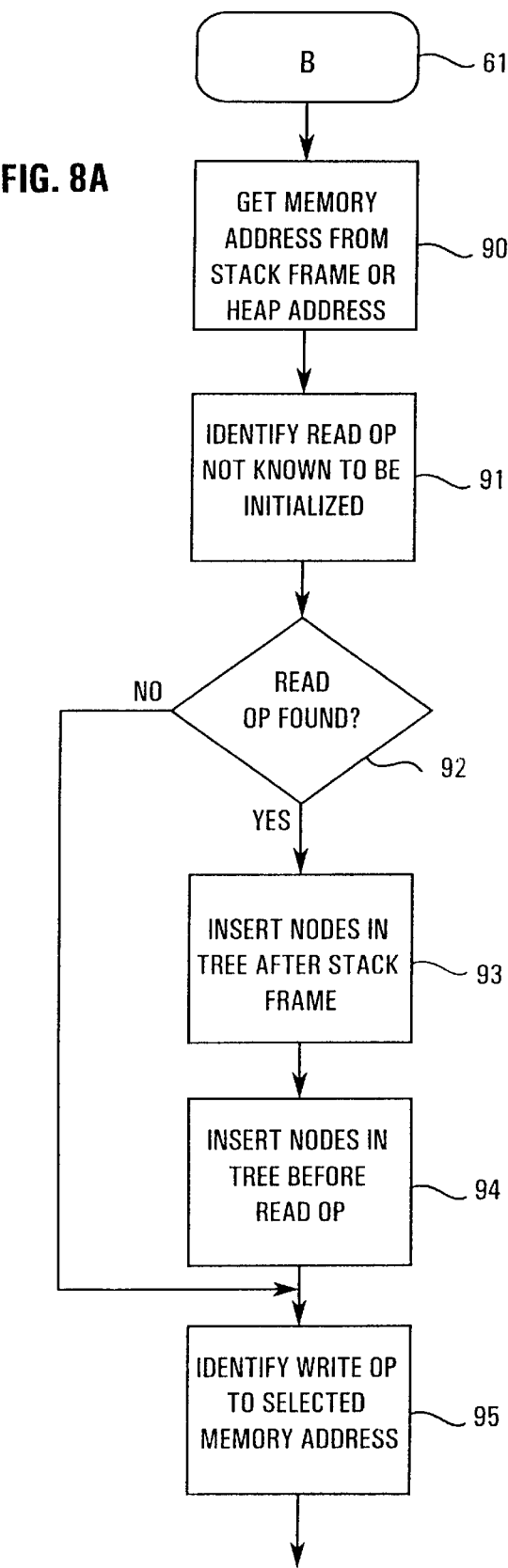

Referring to FIGS. 8A and 8B, a flow chart for a routine for detecting an uninitialized read of a memory variable error condition is shown. First, a memory address is retrieved from a program stack frame (block 90) which represents memory locations of local memory variables. A flow analysis is performed on the source code to identify any read operation to the memory address for which it cannot be statically determined that the variable has been previously initialized (block 91). If a read operation is found (block 92), instrumentation nodes are inserted into the parse tree in two locations. First, nodes are inserted after the parse tree node corresponding to the stack frame containing the memory address for the program variable to be checked (block 93). These nodes are for setting an internal indication to the error-checking engine that the memory variable is uninitialized. Second, instrumentation nodes are inserted into the parse tree before the read operation (block 94) to indicate to the error-checking engine that the memory variable being read by the read operation is either initialized or uninitialized at that point in program execution. These nodes determine the status of the memory variable by referring to the indication set by the instrumentation nodes for the stack frame.

Next, a flow analysis is performed on the source code to identify a write operation to the memory address for the program variable being checked, since any write operation will cause the memory variable in question to be initialized (block 95). If a write operation is found (block 96), instrumentation nodes are inserted into the parse tree after the nodes corresponding to the write operation for setting an indication used by the error-checking engine to indicate that the memory variable in question is initialized (block 97).

Figure 9:
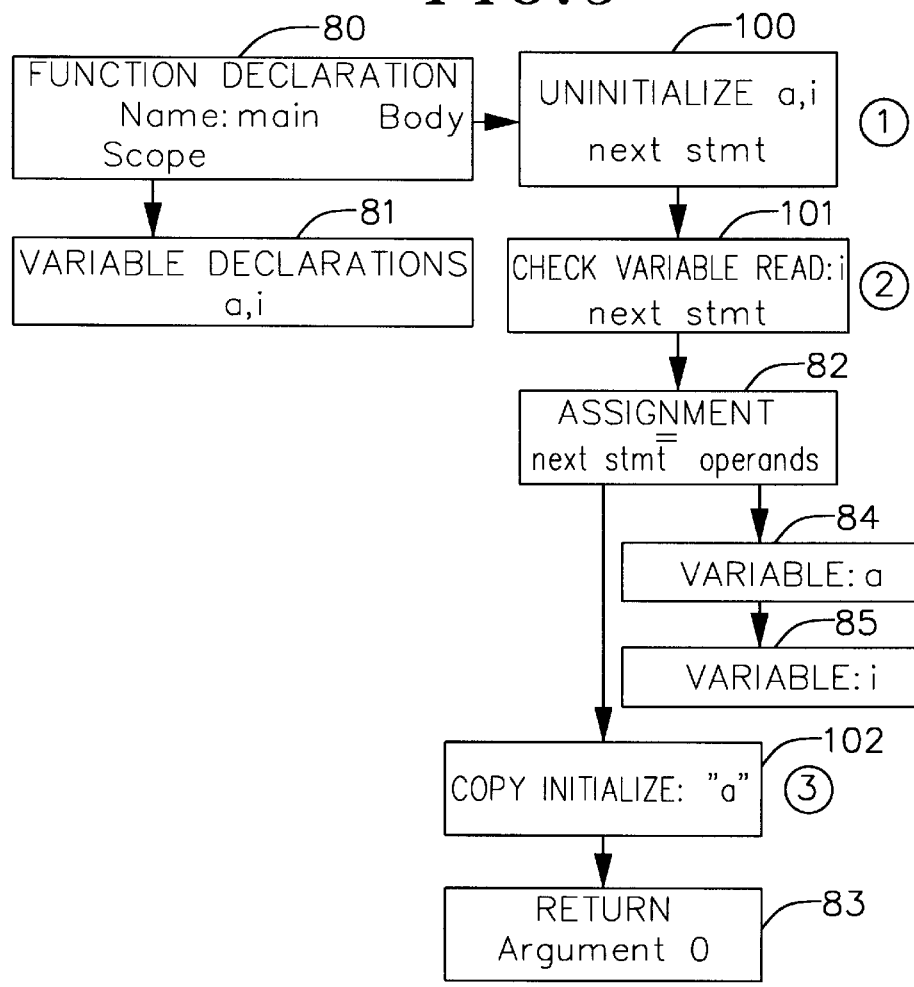
FIG. 9 is a diagram illustrating an instrumented parse tree representation of the source code listing shown in FIG. 6.

Referring to FIG. 9, a diagram illustrating an instrumented parse tree representation of the source code listing shown in FIG. 6 is shown. The instrumentation nodes for the stack frame are inserted as uninitialized node 100. The instrumentation nodes for the read operation are inserted as check variable read node 101. The instrumentation nodes for the write operation are inserted as copy initialize node 102. Uninitialized node 100 indicates to the error-checking engine that the variables "a" and "i" are uninitialized. Check variable read node 101 indicates to the error-checking engine that an actual check for the uninitialized variable "i" should be performed. Finally, copy initialize node 102 indicates to the error-checking engine that the variable "a" is being assigned a value which initializes it by copying a value from some other memory location.

The second category of dynamic error is a write operation to an invalid memory address for a complex memory variable. This is also known as memory corruption which occurs when a program writes to a location in memory that is not valid. For instance, this can happen as a result of writing off of the end of an array. Similarly, it can happen as result of writing to a location in memory that falls outside of the range of memory locations allocated to a complex memory variable, such as a structure.

A complex memory variable comprises a plurality of elements, each of which can be a constant value, a simple memory variable or a complex memory variable. An array comprises a plurality of identical elements, each of which can be constant value, a simple memory variable, or a complex memory variable.

Referring to FIG. 10, a source code listing of a computer program containing a write operation to an invalid memory address is shown. An array "A" is defined comprising ten integer elements (line 3). Each of these ten elements are initialized to 0 (line 5) using a loop beginning at an index value of 1 (lines 4 and 6). The valid indices for the array "A" are 0 through 9. However, the loop begins with an index "i" equaling 1 that is incremented during each successive iteration until the index "i" equals 10 (line 4). Thus, in the tenth iteration, the program attempts to set array element A[10] to 0. This is invalid since array "A" does not have an index value of 10 and therefore an overwrite dynamic error occurs.

Figure 11:
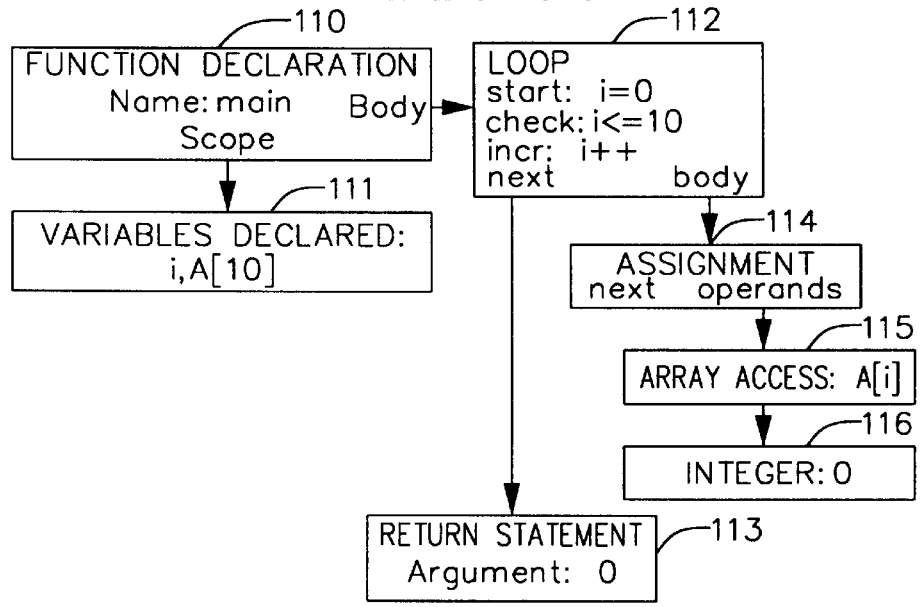
FIG. 11 is a diagram illustrating a parse tree representation of the source code listing in FIG. 10.

Referring to FIG. 11, a diagram illustrating a parse tree representation of the source code listing in FIG. 10 is shown. The function declaration (lines 1, 2 and 8) is represented by function declaration node 110. The declaration of index variable "i" and array "A" which has 10 elements (line 3) is represented by variable declarations node 111. The loop operation (lines 4 and 6) is represented by loop node 112 which is followed by return node 113 (corresponding to line 7). The assignment operation (line 5) has two operands, an array element "A[i]" and an integer constant 0, represented respectively by nodes 115 and 116.

To detect an array operation that is attempting to access an invalid memory location, the parse tree shown in FIG. 11 must be instrumented with debugging functionality so that the error can be automatically detected by the error-checking engine when the program is executed. Here, the array operation is an assignment to element A[10] on line 5 of the program. Element A[10] is out of bounds.

The overall criteria for inserting this type of error check is as follows. For arrays, the array variable and its size must be declared to the error-checking engine. For each write operation to that array, the error-checking engine must check if the index into the array is valid. For complex memory variables, a similar declaration must be made to the error-checking engine; however, the engine must perform a test for whether the memory address being written to falls outside of a valid memory address range defined by the dimension operand used to declare the memory block size for the complex memory variable.

Figure 12:
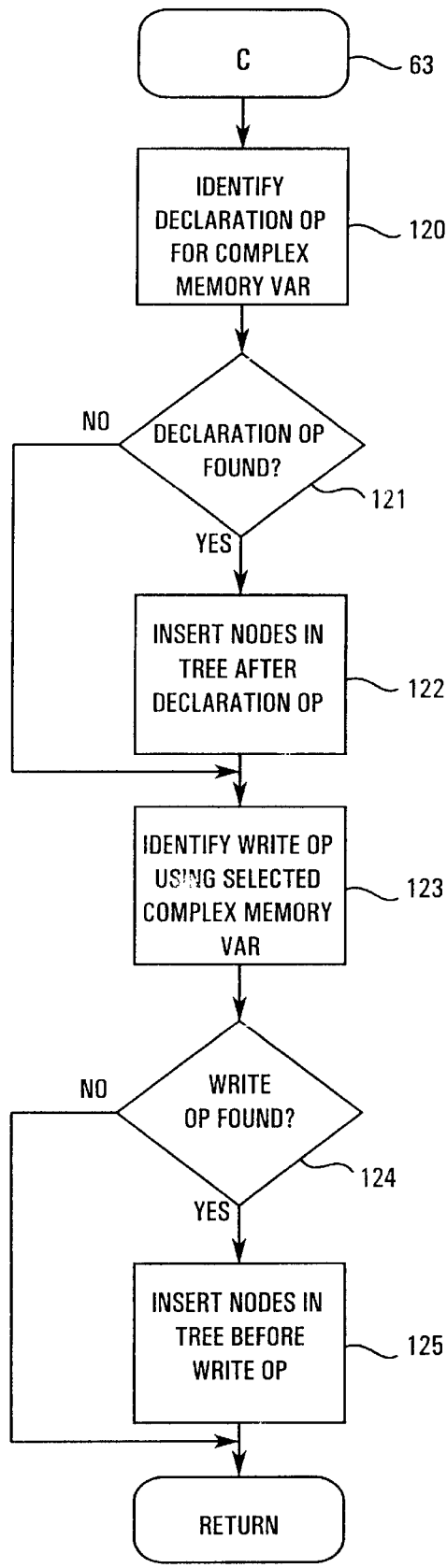
FIG. 12 is a flow chart for a routine for detecting a write operation to an invalid memory address for a complex memory variable error condition.

Referring to FIG. 12, a flow chart for a routine for detecting a write operation to an invalid memory address for a complex memory variable error condition is shown. This involves a more general error check than for an array and is therefore presented initially.

First, a flow analysis is performed on the source code to identify a declaration operation for a complex memory variable (block 120). Such a variable comprises a plurality of elements, each of which can be a constant value, a simple memory variable or a complex memory variable. A declaration operation for a complex memory variable comprises two components: an identifier operand for identifying the variable and a dimension operand for identifying a memory block size. If a declaration operation is found (block 121), instrumentation nodes are inserted after the parse tree node corresponding to the declaration operation (block 122). These nodes are for storing the dimension operand for use by the error-checking engine during execution.

Next, a flow analysis is performed on the source code to identify a write operation using the complex memory variable being checked (block 123). If a write operation is found (block 124), instrumentation nodes are inserted into the parse tree before the nodes corresponding to the write operation (block 125). During execution, the error-checking engine can indicate that the write operation is writing to an invalid memory address falling outside of the memory address range defined by the stored dimension operand.

To check for a write to an invalid array memory location, an additional step is required to those shown in FIG. 12. It comprises augmenting the last step with inserting instrumentation nodes into the parse tree to further indicate to the error-checking engine that a write operation is being performed on an array element falling outside of the range of valid array indices.

Figure 13:
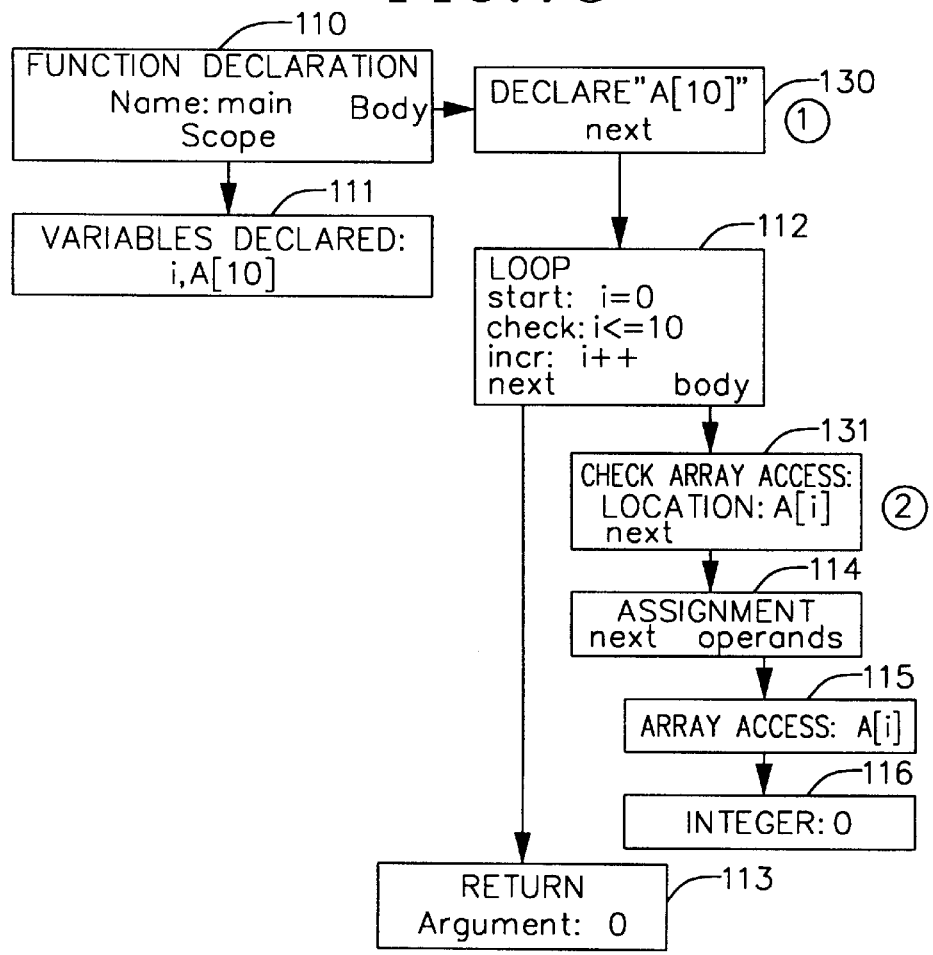
FIG. 13 is a diagram illustrating an instrumented parse tree representation of the source code listing shown in FIG. 10.

Referring to FIG. 13, a diagram illustrating an instrumented parse tree representation of the source code listing shown in FIG. 10 is shown. The instrumentation nodes for the declaration operation are inserted as declare node 130. The instrumentation nodes for the write operation are inserted as check array access node 131. Declare node 130 indicates to the error-checking engine that the array "A" is declared and contains ten elements. Since the present program is written in C language and array indices begin with 0, the range of valid indices for array "A" are from 0 through 9. The check array access node 131 indicates to the error-checking engine that a write operation is being performed on an element of array "A" and that the value of the index, here index "i", should be checked to determine whether it falls within the range of valid array indices.

The third category of dynamic error is a dynamic memory manipulation error using a pointer memory variable. This occurs when memory pointers no longer reflect the actual layout of memory due to problems with dynamic memory manipulation. This often involves a "dangling pointer" which is a memory pointer which points to a block of memory that has since been "freed," that is, deallocated. While the memory pointer still points to the address of the same freed memory block, the address is no longer a representative of the dynamic state associated with the original pointer assignment. Six types of errors can occur, such as reading from or writing to a dangling pointer, passing a dangling pointer as an argument of a function, returning a dangling pointer from a function, freeing the same memory block multiple times, freeing stack memory (local variables), and attempting to free a memory block using a pointer that does not point to the beginning of a valid memory block.

Referring to FIG. 14, a source code listing of a computer program containing a dynamic memory manipulation error using a pointer memory variable is shown. A pointer memory variable "ptr" is defined (line 3). Next, a 10-character memory block is allocated and its pointer assigned to pointer memory variable "ptr" (line 4). The pointer memory variable "ptr" is incremented (line 5) and an attempt is made to free the memory block that it points to (line 6). However, the attempt can ultimately lead to memory corruption since pointer memory variable "ptr" no longer points to the start of the memory block that was originally assigned to it. Therefore, a dynamic memory manipulation error occurs.

Figure 15:
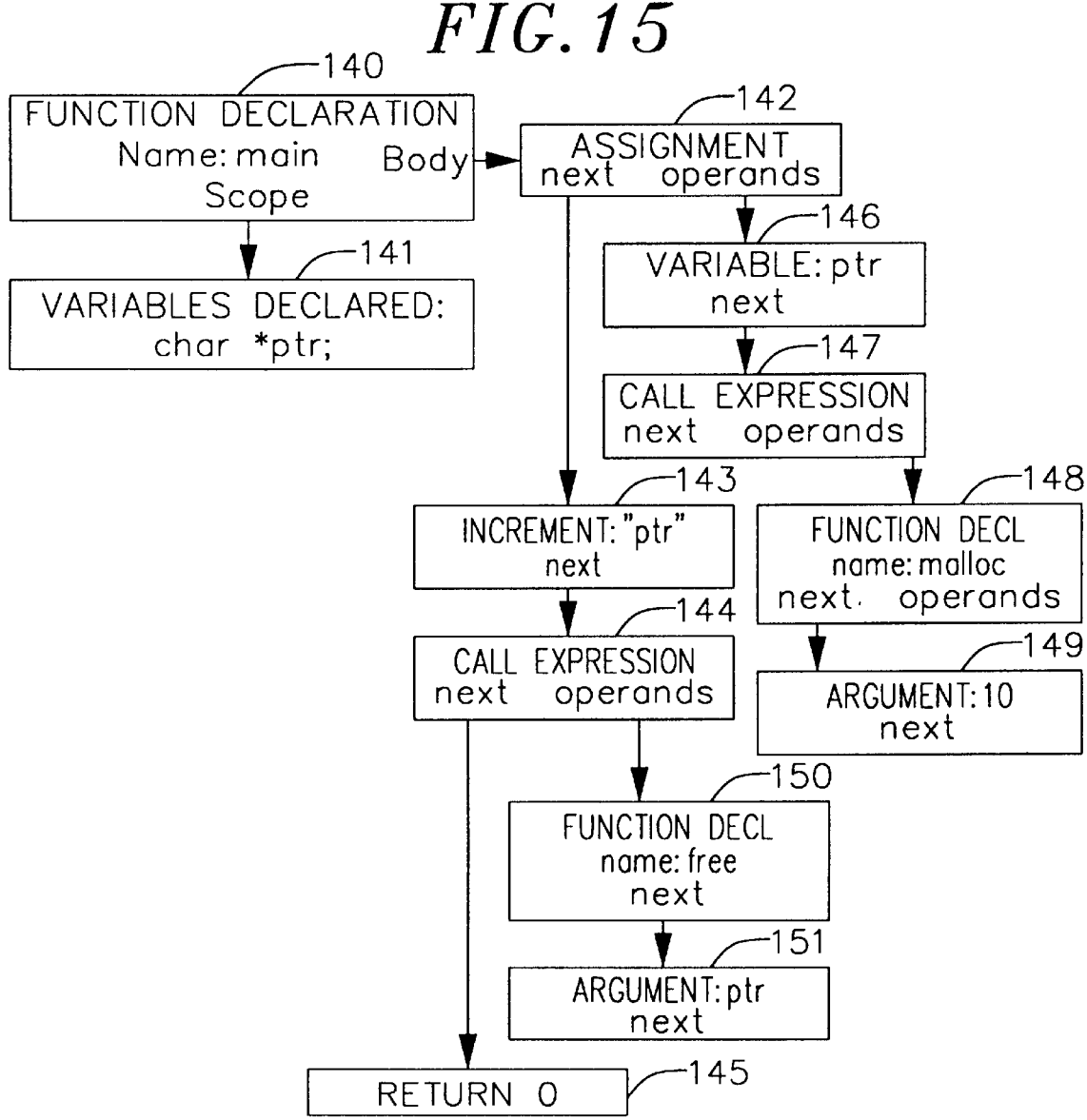
FIG. 15 is a diagram illustrating a parse tree representation of the source code listing in FIG. 14.

Referring to FIG. 15, a diagram illustrating a parse tree representation of the source code listing in FIG. 14 is shown. The function declaration (lines 1, 2 and 8) is represented by function declaration node 140. The declaration of pointer memory variable "ptr" (line 3) is represented by variable declaration node 141. The allocation of the 10-character memory block is represented by call expression node 147, which has two operands, a function declaration and an argument, represented respectively by nodes 148 and 149. The result from this function call is assigned to the pointer memory variable (line 4), which is represented by assignment node 142. This node has two operands, a pointer memory variable and the function call, represented respectively by nodes 146 and 147. The pointer increment operation (line 5) is represented by node 143. The free memory block operation (line 6) is represented by node 144, which has two operands: a function call declaration and an argument, represented respectively by nodes 150 and 151. The return operation (line 7) is represented by node 145.

Figure 16A:
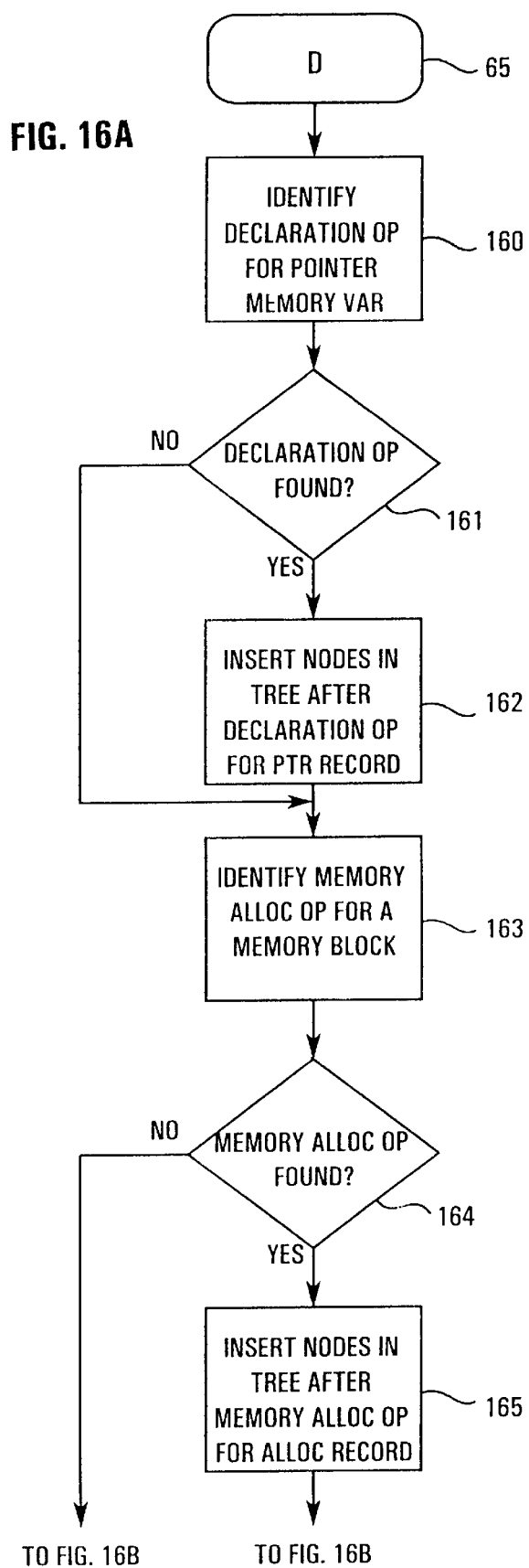

Referring to FIGS. 16A and 16B, a flow chart for a routine for detecting a dynamic memory manipulation error using a pointer memory variable error condition is shown. This involves a more general error check than for the six specific types of memory manipulation errors listed above and is therefore presented initially.

First, a flow analysis is performed on the source code to identify a declaration operation for a pointer memory variable (block 160), comprising an identifier operand for identifying the variable. If a declaration operation is found (block 161), instrumentation nodes are inserted after the parse tree node corresponding to the declaration operation (block 162). These nodes are for storing in a pointer record a value field for a memory address contained in the pointer memory variable during execution. Initially, the pointer memory variable points to nothing and the pointer record is therefore empty.

A flow analysis is then performed on the source code to identify a memory allocation operation for allocating a memory block to the pointer memory variable being checked (block 163). If a memory allocation operation is found (block 164), instrumentation nodes are inserted into the parse tree after the nodes corresponding to the memory allocation operation (block 165). These nodes are for storing an allocation record for use by the error-checking engine during execution. Each allocation record contains the following information: block size, starting memory address for the block, addresses of memory pointers that point to the memory block, a list of memory pointers that are contained within the memory block, and state information regarding the memory block.

Next, a flow analysis is performed on the source code to identify an assignment operation to the selected pointer memory variable (block 166). If an assignment operation is found (block 167), instrumentation nodes are inserted into the parse tree after the nodes corresponding to the assignment operation (block 168). These nodes are for indicating to the error-checking engine that the pointer memory variable may contain a different and possibly invalid memory address.

Figure 17A:
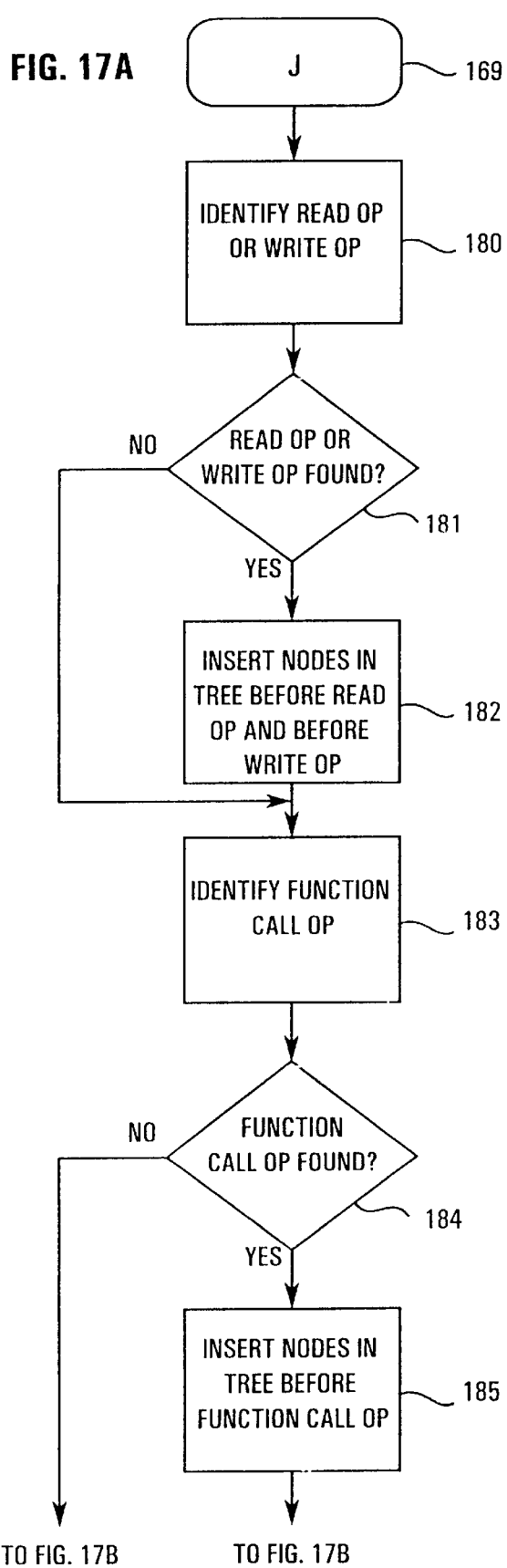

The previous steps having been accomplished, the routine can therefore perform a dynamic memory manipulation check (block 169). Referring to FIGS. 17A and 17B, a flow chart for a routine for performing a dynamic memory manipulation check is shown. This performs the six types of dynamic memory manipulation checks listed previously.

A flow analysis is performed on the source code to identify a read operation or a write operation using the pointer memory variable being checked (block 180). If a read operation or a write operation is found (block 181), instrumentation nodes are inserted into the parse tree before the nodes corresponding to the read operation or the write operation (block 182). During execution, the error-checking engine can indicate that the read operation or the write operation is attempting to operate on a pointer memory variable when it contains a dangling pointer, this is, a memory address for a freed memory block.

Next, a flow analysis is performed on the source code to identify a function call operation using the pointer memory variable being checked (block 183). If a function call operation is found (block 184), instrumentation nodes are inserted into the parse tree before the nodes corresponding to the function call operation (block 185). During execution, the error-checking engine can indicate that the function call operation is calling a function using a pointer memory variable containing a memory address for a freed memory block.

Next, a flow analysis is performed on the source code to identify a function call return operation using the pointer memory variable being checked (block 186). If a function call return operation is found (block 187), instrumentation nodes are inserted into the parse tree before the nodes corresponding to the function call return operation (block 188). During execution, the error-checking engine can indicate that the function call return operation is returning a memory address for a freed memory block to the calling function in the computer program.

Finally, a flow analysis is performed on the source code to identify a free memory block operation using the pointer memory variable being checked (block 189). If a free memory block operation is found (block 190), instrumentation nodes are inserted into the parse tree before the nodes corresponding to the free memory block operation (block 191). During execution, the error-checking engine can indicate that the free memory block operation is attempting to free a memory block multiple times by using a pointer memory variable pointing to an already freed memory block or is attempting to free a stack frame (local variables) or is attempting to free a memory block when the memory address does not equal the starting memory address of the memory block.

Figure 18:
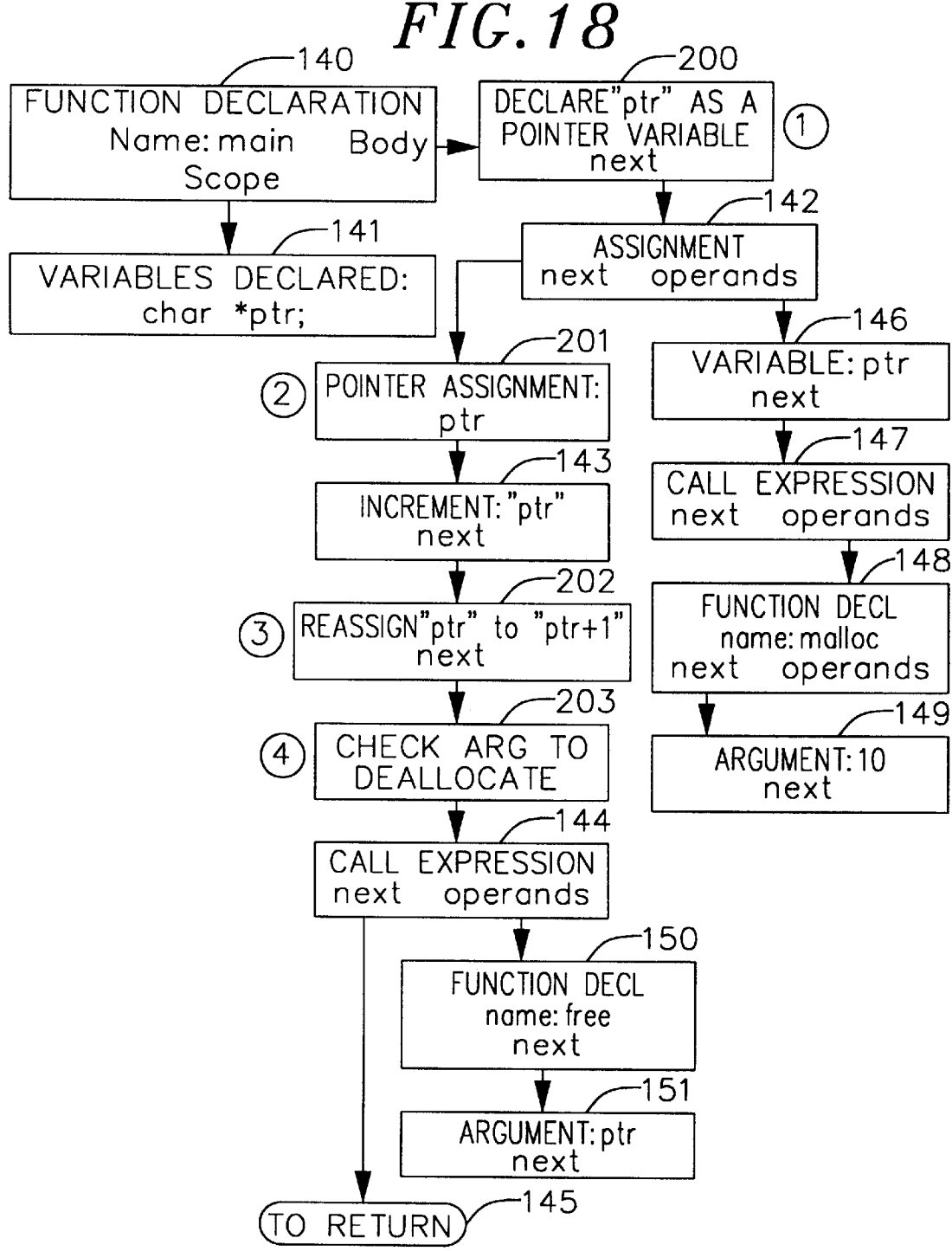
FIG. 18 is a diagram illustrating an instrumented parse tree representation of the source code listing shown in FIG. 14.

Referring to FIG. 18, a diagram illustrating an instrumented parse tree representation of the source code listing in FIG. 14 is shown. The instrumentation nodes for the declaration operation are inserted as declare node 200. The instrumentation nodes for the assignment operation are inserted as pointer assignment node 201. Similarly, the instrumentation nodes for a further assignment operation are inserted as reassign node 202. Finally, the instrumentation nodes for the pre-memory block operation inserted as check arg to deallocate node 203. Declaration node 200 indicates to the error-checking engine that the pointer memory variable "ptr" is declared and uninitialized. The pointer assignment node 200 and reassign node 202 indicate to the error-checking engine that the pointer memory variable "ptr" has been initialized and incremented, respectively. The check arg to deallocate node 203 indicates to the error-checking engine that the program is attempting to free the memory pointed to by the pointer memory variable "ptr."

The fourth category of dynamic error is an inappropriate use of a pointer memory variable. Five types of errors can occur, comprising a pointer operation on a null pointer, a pointer operation on an uninitialized pointer, a pointer operation on a pointer that does not point to valid data, a pointer operation attempting to compare or otherwise relate memory pointers that fail to point to the same type of data object, and an attempt to make a function call using a function pointer that does not point to a function.

Referring to FIG. 19, a source code listing of a program segment containing an inappropriate use of a pointer memory variable is shown. Two long integer pointers "a" and "b" and a pointer to a function returning a long integer "foo" are defined (line 1). Next, the memory address of variable "a" is assigned using a cast to a pointer to a function returning a long integer "foo" (line 2). Finally, the return value of a function call to "foo" is assigned to variable "b" (line 3). This code segment is problematic because the function pointer "foo" actually points to a location in the program stack representing the memory block assigned to variable "a" instead of an appropriate entry point in the code segment. Therefore, the function pointer "foo" has been inappropriately used and a pointer memory variable error condition occurs.

Figure 20:
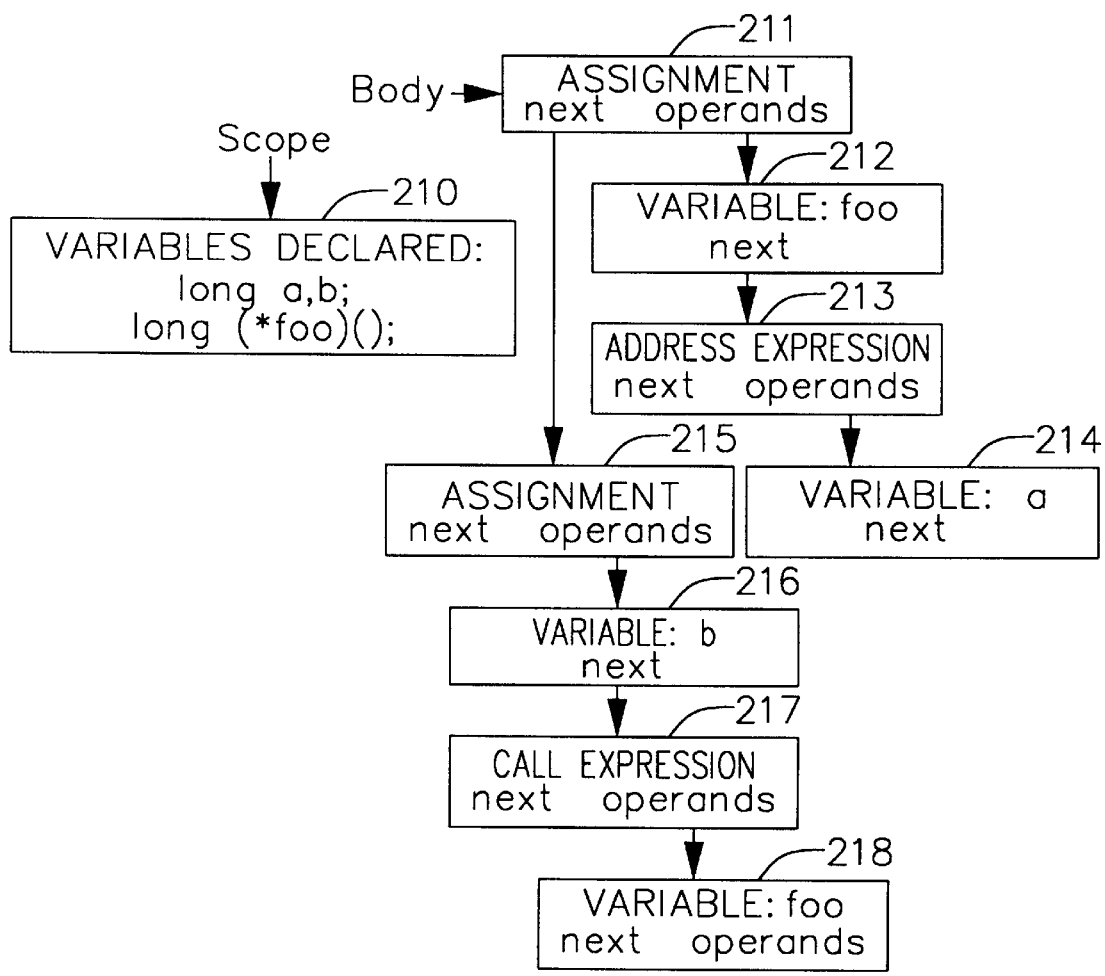
FIG. 20 is a diagram illustrating a parse tree representation of the source code listing shown in FIG. 19.

Referring to FIG. 20, a diagram illustrating a parse tree representation of the source code listing in FIG. 19 is shown. The long integer variable declarations (line 1) are represented by variables declared node 210. The assignment operation (line 2) is represented by node 211, which has two operands, a variable (representing the left-hand side of the assignment) and an address expressions (representing the right-hand side of the assignment), represented respectively by nodes 212 and 213. The address expression node 213 operates on variable "a", which is represented by variable node 214. The assignment node 211 is followed by assignment node 215, which represents the assignment to variable "b" (line 3). This node has two operands, a variable and a function call to "foo", represented respectively by nodes 216 and 217. The call expression node 217 has one operand, a variable, represented by node 218.

Figure 21A:
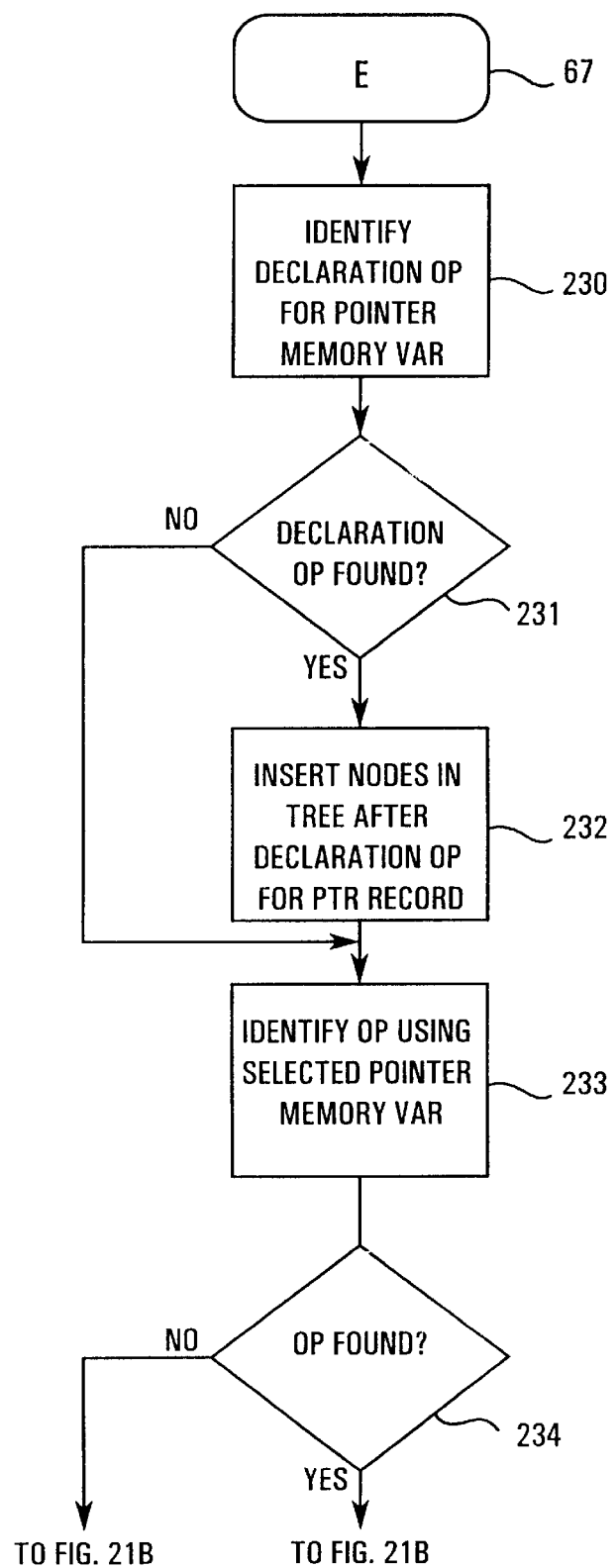

Referring to FIGS. 21A and 21B, a flow chart for a routine for an inappropriate use of a pointer memory variable error condition is shown. First, a flow analysis is performed on the source code to identify a declaration operation for a pointer memory variable (block 230), comprising an identifier operand for identifying the variable. If a declaration operation is found (block 231), instrumentation nodes are inserted after the parse tree node corresponding to the declaration operation (block 232). These nodes are for storing in a pointer record a value field for a memory address contained in the pointer memory variable during execution. Initially, the pointer memory variable points to nothing and the pointer record is therefore empty.

Next, a flow analysis is performed on the source code to identify an operation using the pointer memory variable being checked (block 233). If an operation is found (block 234), instrumentation nodes are inserted into the parse tree before the nodes corresponding to the operation (block 235). These nodes are for performing the five types of error checks listed above, including checking for operations on a null pointer, an uninitialized pointer, a pointer to invalid data, mismatched pointer types, and an invalid function call pointer.

Figure 22:
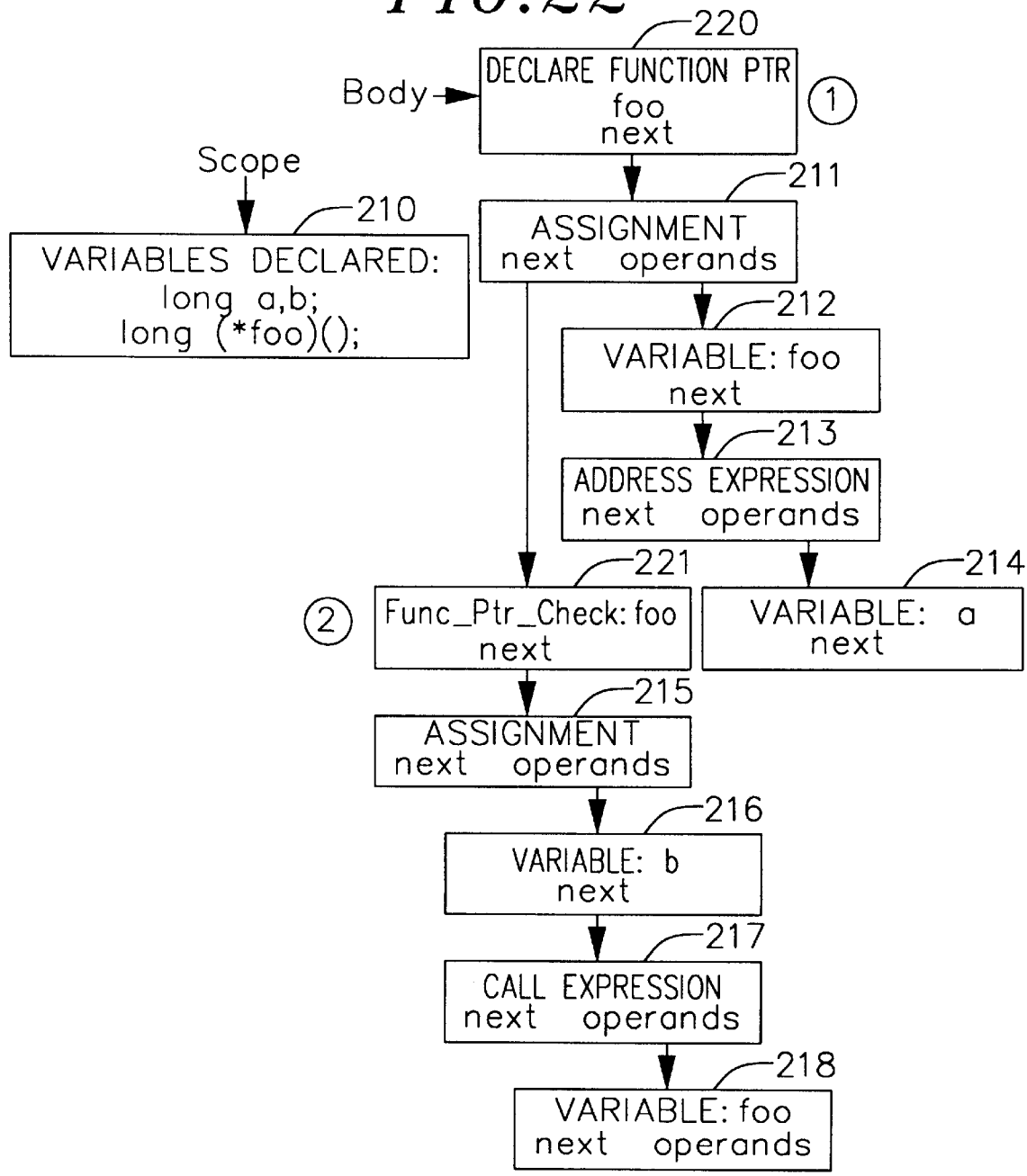
FIG. 22 is a diagram illustrating an instrumented parse tree representation of the source code listing shown in FIG. 19.

Referring to FIG. 22, a diagram illustrating an instrumented parse tree representation of the source code listing in FIG. 19 is shown. The instrumentation node for the function pointer declaration operation is inserted as declare function "ptr" node 220. The instrumentation node for the function pointer check is inserted as func__ptr__check node 221. The declare function "ptr" node 220 is used by the error-checking engine for runtime pointer tracking. The func__ptr__check node 221 is the actual check for a bad function pointer. During runtime, the error-checking engine determines that the value assigned to the function pointer "foo", is an address on the stack and is not an appropriate function address.

The fifth category of dynamic error is a memory leak error, which occurs when a dynamically allocated memory block is no longer referenced by a memory pointer and consequently can never be freed (deallocated). There are three types of errors. The first, a leak while freeing memory, can occur when a block of memory is freed which contains memory pointers that point to other allocated memory blocks. Any references to those allocated memory blocks are lost. The second, a leak return value, occurs when a function call returns an allocated memory block but the calling function does not assign that memory block to a pointer memory variable. The third, leak scope, occurs when a local pointer memory variable points to a memory block that is also local in scope and the function does not free the memory which it uniquely references before it goes out of scope.

Referring to FIG. 23, a source code listing of a computer function containing a memory leak error is shown. A 10-character memory block is allocated and its pointer assigned to pointer memory variable "ptr," which is a local variable defined in the same statement (line 3). The function "foo" uniquely references the memory block allocated whose memory address is assigned to the local pointer memory variable "ptr." The function returns (line 4) with "ptr" going out of scope. Consequently, the memory block formerly pointed to by "ptr" is leaked since "ptr" is no longer accessible. Therefore, a memory leak error occurs.

Figure 24:
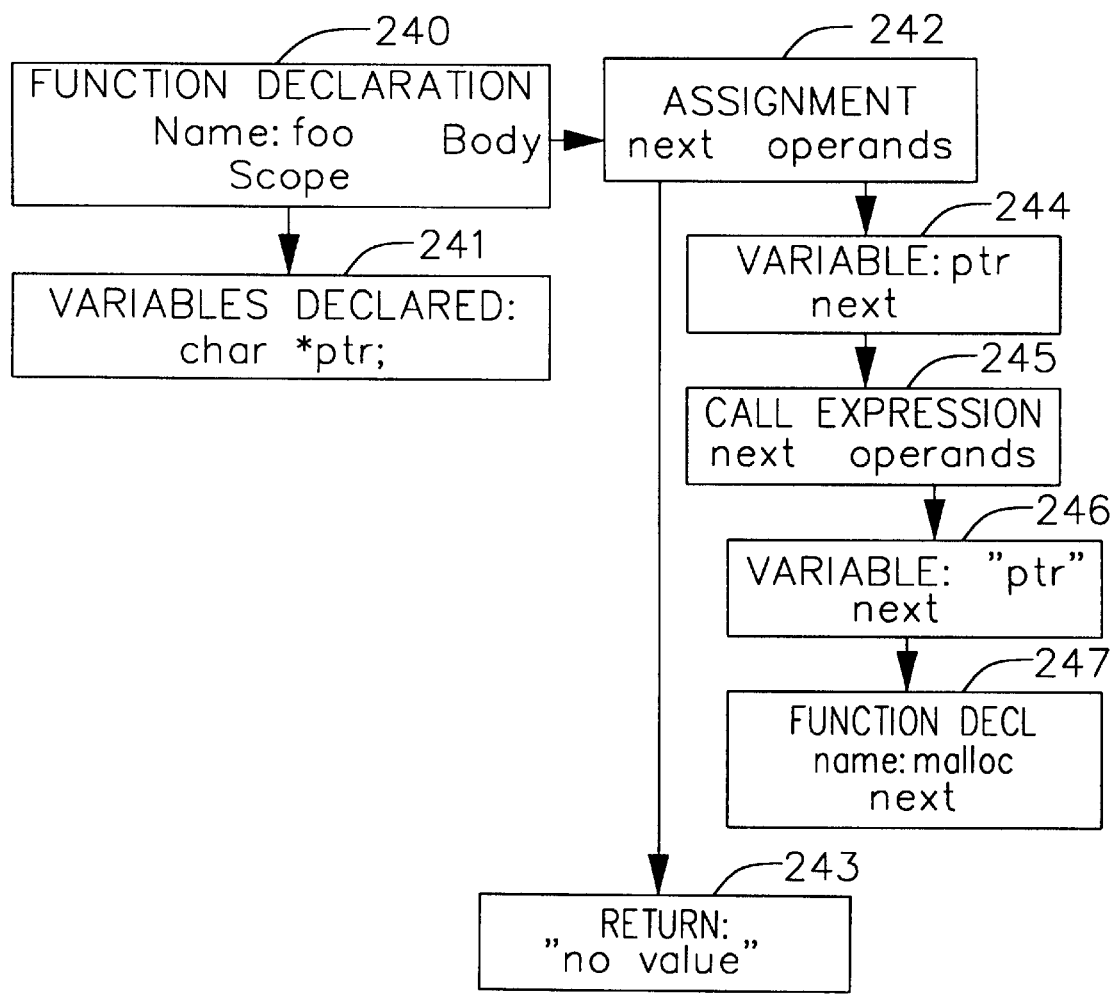
FIG. 24 is a diagram illustrating a parse tree representation of the source code listing shown in FIG. 23.

Referring to FIG. 24, a diagram illustrating a parse tree representation of the source code listing in FIG. 23 is shown. The function declaration (lines 1, 2 and 5) is represented by function declaration node 240. The declaration of local pointer memory variable "ptr" (line 3) is represented by a variable declaration node 241. Similarly, the allocation of the 10-character memory block is represented by call expression node 245, which has two operands, an argument and a function declaration, represented respectively by nodes 246 and 247.

The function declaration calls a memory allocation routine for dynamically allocating a block of memory. Such a routine could be the "malloc( )" function call or the like in C language. The result from this routine is assigned to the local pointer memory variable (line 3), which is represented by assignment node 242. This node has two operands, a pointer memory variable and the function call, represented respectively by nodes 244 and 245. The return operation (line 4) is represented by node 243.

Figure 25:
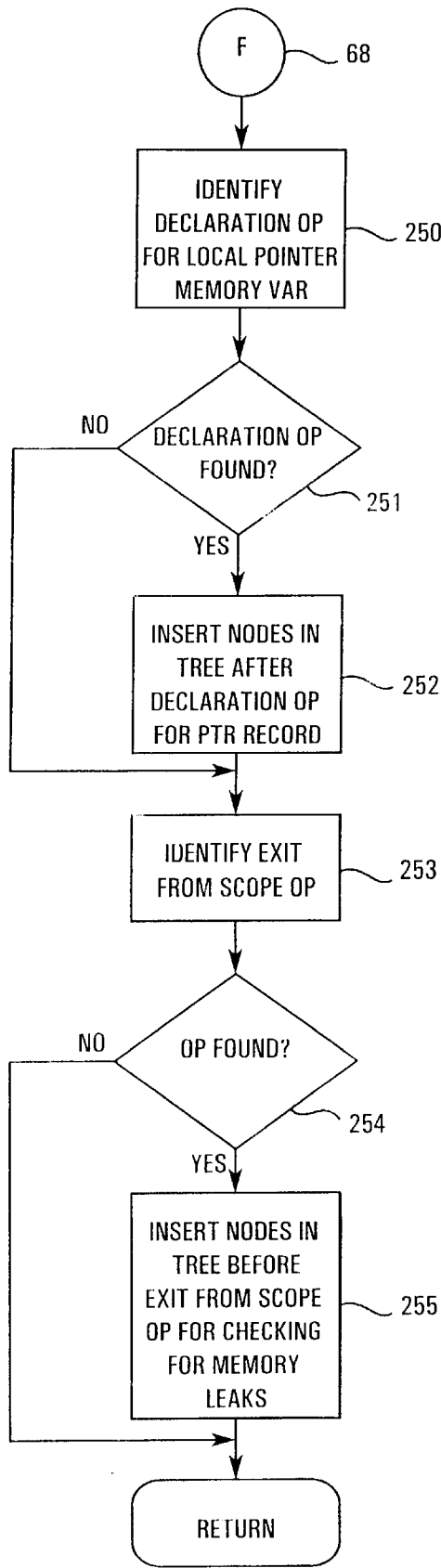
FIG. 25 is a flow chart of a routine for detecting a memory leak error condition.

Referring to FIG. 25, a flow chart for a routine for detecting a memory leak error condition is shown. First, a flow analysis is performed on the source code to identify a declaration operation for a pointer memory variable (block 250), including an identifier operand for identifying the variable. If a declaration operation is found (block 251), instrumentation nodes are inserted after the parse tree node corresponding to the declaration operation (block 252). These nodes store a pointer record indicating information about the block of memory that it points to.

Next, a flow analysis is performed on the source code to identify an exit from scope operation, such as a return from a function call (block 253). If such an operation is found (block 254), instrumentation nodes are inserted before the parse tree node corresponding to the exit from scope operation (block 255). These nodes are for detecting memory leaks. Thus, when the function exits or the pointer goes out of scope, the error-checking engine is informed by a "pop scope" directive. Upon that occurrence, the engine can examine the list of pointers declared in that scope. For each pointer, if the block of memory that it is pointing to is only pointed to by a local pointer variable, the memory is leaked when the pointer goes out of scope.

Memory leaks can be detected in one of two ways. The first is during an assignment of a new address to a pointer variable. If the memory block that used to be pointed to by the pointer is being reassigned and the memory block is only pointed to by that pointer, the block is leaked by the assignment operation. Second, a memory leak can occur upon the exiting of a scope. If there is a memory block which is pointed to only by a pointer declared locally in scope within the function being exited, the memory block is leaked.

During operation, the error-checking engine initializes a pointer record for each pointer in a function upon activation. For any assignment of an address to a pointer, the pointer record is updated to indicate that the pointer contains the address of an allocated memory block. Similarly, the memory block record pointer list is updated to indicate that the pointer is pointing to that block. Finally, upon the exit from the routine, all pointer records are cleared.

Figure 26:
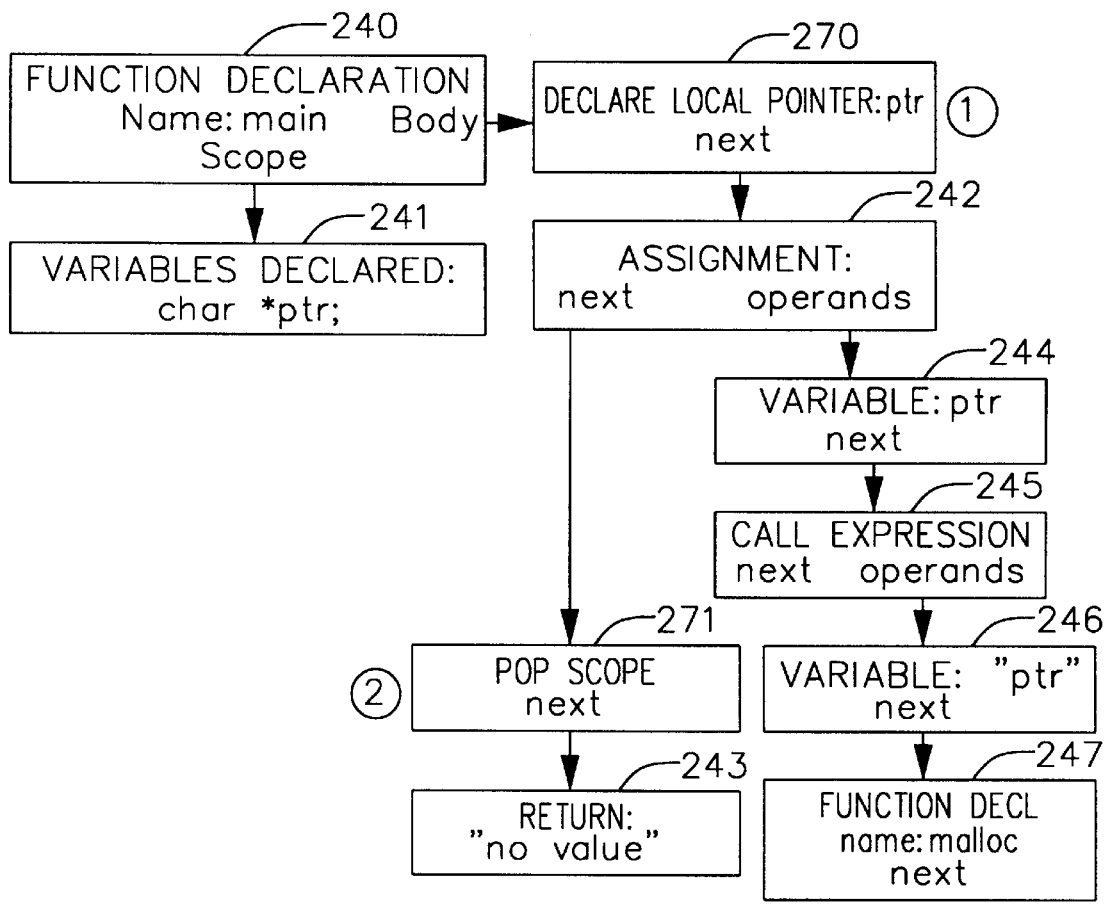
FIG. 26 is a diagram illustrating an instrumented parse tree representation of the source code listing shown in FIG. 23.

Referring to FIG. 26, a diagram illustrating an instrumented parse tree representation of the source code listing in FIG. 23 is shown. The assignment of the local allocated memory block to the local pointer memory variable in assignment node 242 indicates to the error-checking engine that variable "ptr" is pointing to a particular memory block. Subsequently, when the pointer goes out of scope, the pointer record maintained by the error-checking engine is removed from the memory block record. Since that record now has an empty list of pointers pointing to it, the error-checking engine can detect that memory has been leaked. The instrumentation nodes for the declaration operation are inserted as declare local pointer node 270. The instrumentation nodes for the pop scope operation are inserted as pop scope node 271. Declare local pointer node 270 indicates to the error-checking engine that the local pointer memory variable "ptr" is declared and uninitialized. The pop scope node 271 indicates to the error-checking engine that "ptr" has gone out of scope due to a return operation from the function.

Instrumentation routines can also be used to introduce a user-definable instrumentation routine known as an interface. This type of routine enables a user to add their own rules for transforming the source code. An interface routine can have the same behavior as the source code it is replacing or it can do something completely different, such as checking values of variables, simulating errors or performing any other type of dynamic tasks.

Typically, user-defined interfaces allow the user to add custom error checking to function calls as a means of enforcing rules on the way that the function is called and the side effects that it has on memory. These types of interfaces check that all parameters are of the correct data type, that memory pointers point to memory blocks of the appropriate size, and that each parameter value is within its correct range.

Referring to FIG. 27A, a program segment of a computer function to be instrumented with an interface is shown. Here, the interface is for a memory allocation call using the "malloc( )" function (line 1). Referring to FIG. 27B, the interface routine is shown. In this example, the interface is similar to a complicated macro definition because the given function call is replaced by a user defined interface.

The "iic_" prefixed functions are expanded into function calls to the runtime back-end processor. Two such function calls are employed in this example. The "iic_error ( )" function call communicates error messages to the back-end processor (lines 5 and 10). The "iic_alloc( )" function call communicates to the back-end processor that a block of memory of size "size" has been allocated and is pointed to by pointer "a" (line 8).

In addition, two further error checks are performed by the interface. First, it checks to see whether the size of the memory block being allocated is a positive number (lines 4–5). If it is, the memory allocation "malloc( )" function call is allowed to go forward (line 6). Next, the pointer memory variable "a" is checked to determine if the memory allocation function call failed, and if so, the back-end processor is so informed (lines 7–10).

Figure 28:
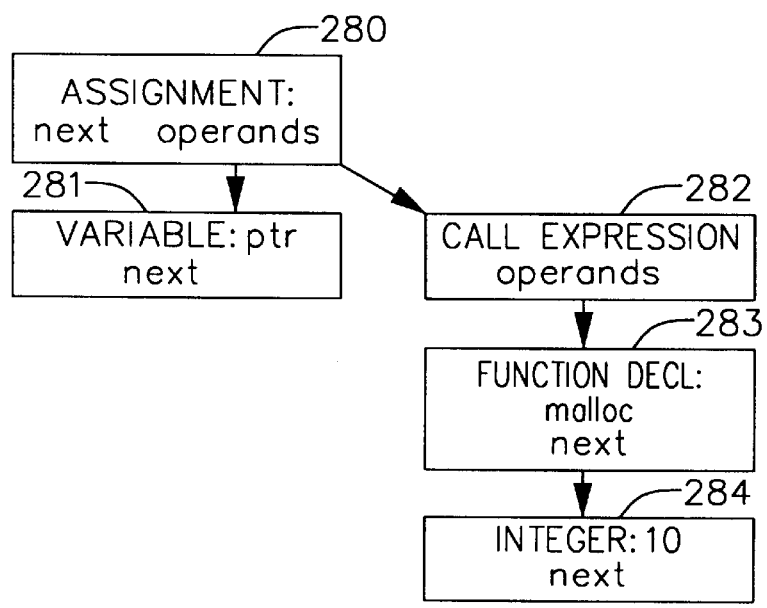
FIG. 28 is a diagram illustrating a parse tree representation of the program segment shown in FIG. 27A.

Referring to FIG. 28, a diagram illustrating a parse tree representation of the program segment shown in FIG. 27A is shown. The assignment operation (line 1) is represented by assignment node 280, which has two operands, a variable operand (representing the left-hand side of the assignment) and a function call expression operand (representing the right-hand side of the assignment), represented respectively by nodes 281 and 282. In turn, the call expression node 282 has two operands, a function declaration for a "malloc( )" function and an integer constant, represented respectively by nodes 283 and 284.

Figure 29A:
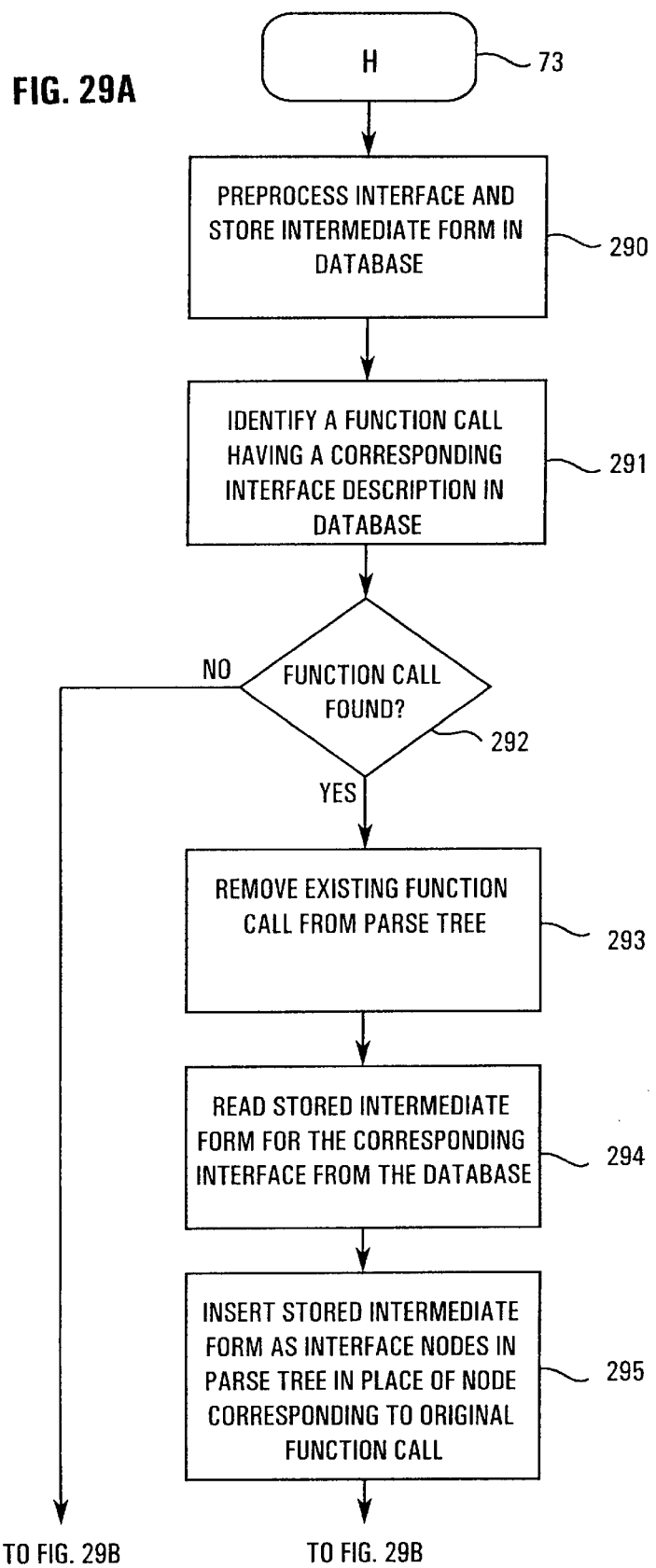

Referring to FIG. 29, a flow chart for a routine for inserting an interface is shown. Before an interface can be used, it must first be pre-processed to convert it from source code into an intermediate form and then stored in a database for later use (block 29). A flow analysis is then performed on the source code to identify function calls having a corresponding interface description to that stored in the database (block 291). If a matching function call is found (block 292), the interface is inserted into the parse tree in a multi-step process.

This process includes the step of first removing the existing function call from the parse tree (block 293). Next, the stored intermediate form for the corresponding interface is read from the database (block 294). The stored intermediate form is inserted as interface nodes in the parse tree in place of the node corresponding to the original function call (block 295). The original function call arguments are substituted into placeholders in the interface nodes (block 296). This enables the interface to actually perform the original function which is called within the interface function itself. Finally, the return statement and the interface node are replaced with an assignment of the result of the interface routine to the actual call to the original function call (block 297). This enables the original calling function to receive the result that was expected without the interface.

Figure 30:
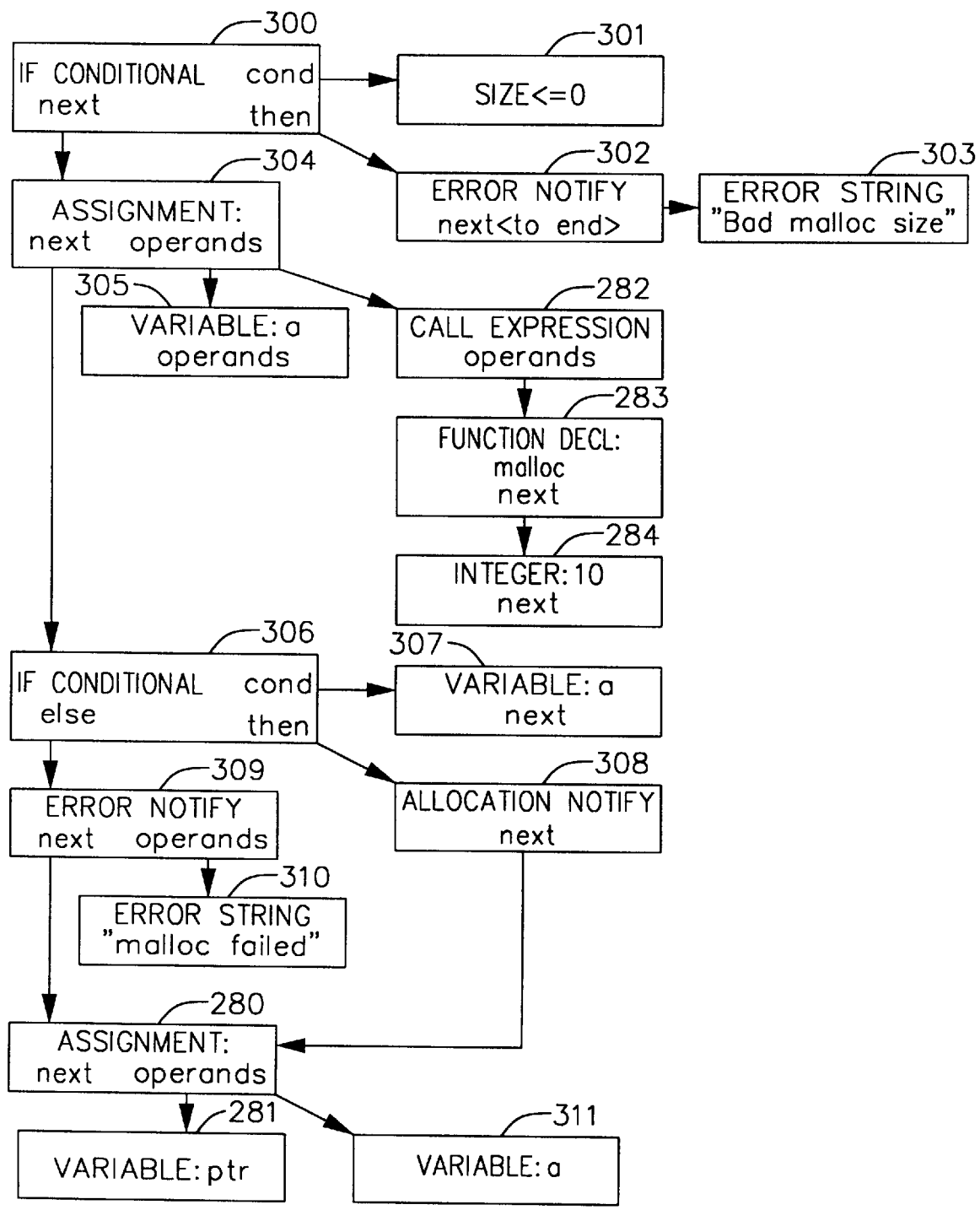
FIG. 30 is a diagram illustrating an instrumented parse tree representation of the program segment shown in FIG. 27A.

Referring to FIG. 30, a diagram illustrating an instrumented parse tree representation of the program segment shown in FIG. 27A is shown. This parse tree differs from those used in other parts of the invention. The original parse tree node representation has been broken into two sections and grafted onto the intermediate form for the interface routine. The entire parse tree shown in FIG. 30 is grafted in place of the parse tree shown in FIG. 28.

The grafted parse tree segment shown in FIG. 30 reflects the program structure of the interface routine source code. The conditional check for a positive memory block size is inserted as "if conditional" node 300 with the conditional test represented by node 301 (line 4). The body of the conditional statement is represented by error notify node 302 and error string node 303 (line 5) which communicate to the runtime back-end processor the occurrence of a dynamic runtime error condition. The original function call to the memory allocation routine "malloc( )" (line 6) is represented by assignment node 304 which has two operands, a variable and an expression call, represented respectively by nodes 305 and 282. Note that nodes 282, 283 and 284 are substituted into the interface intermediate form in the place of placeholders.

The error check for a memory allocation operation failure is represented by "if conditional" node 306 with the conditional test represented by node 307 (line 7 and 9). The body of the "then" condition is represented by allocation notify node 308 (line 8) which tells the runtime processor that a block of memory of size "size" has been allocated and is pointed to by pointer "a". The body of the "else" condition is represented by error notify node 309 (line 10) which has one operand, error string node 310. Finally, an assignment condition is grafted to the end of the intermediate form to assign the result from the interface, represented by variable node 311, to the original function call.

Instrumentation routines can also be used to insert support for automatic test case generation. One embodiment of the present invention is described in "Overview of the Design of TGS System," which is attached as Appendix B, the subject matter of which is hereby incorporated by reference as if set forth in full. By performing a flow analysis of the source code, a two-fold criteria can be satisfied. First, instrumentation routines can be inserted to automatically generate program inputs to achieve full testing of all flow paths in the executable program. Second, instrumentation routines can be used to identify inputs that cause the program to perform incorrectly.

The method involves analyzing the source code to identify points where input data is needed. Next, various techniques are employed, ranging from random number generation to heuristic flow analysis techniques, to generate a set of input cases that satisfy the two-fold criteria stated above. The resulting executable program is linked to a test harness which repeatedly runs the program with different input values and adds unique test cases to a database of test case data. The testing algorithm converges when the two-fold criteria is met or when no new test cases can be generated in a reasonable amount of time.

Referring to FIG. 31, a source code listing of a computer function to be instrumented for automatic test case generation is shown. The purpose of this function is to accept an input character and determine whether it is an integer. Three character memory variables are declared, "b," "c" and pointer "ptr" (line 3). An input function "getchar( )" is called to obtain an input character whose value is assigned to variable "c" (line 4). That value is checked to determine whether it falls in the numeric range of ASCII codes for integer characters (line 5). If it does not, the pointer memory variable "ptr" is set to 0 (line 6). The variable "b" is assigned the difference of a "0" ASCII character code subtracted from the input character stored in variable "c" (line 8). A problem with this function is that the pointer memory variable "ptr" is not yet initialized before it is dereferenced by setting it to 0.

Figure 32:
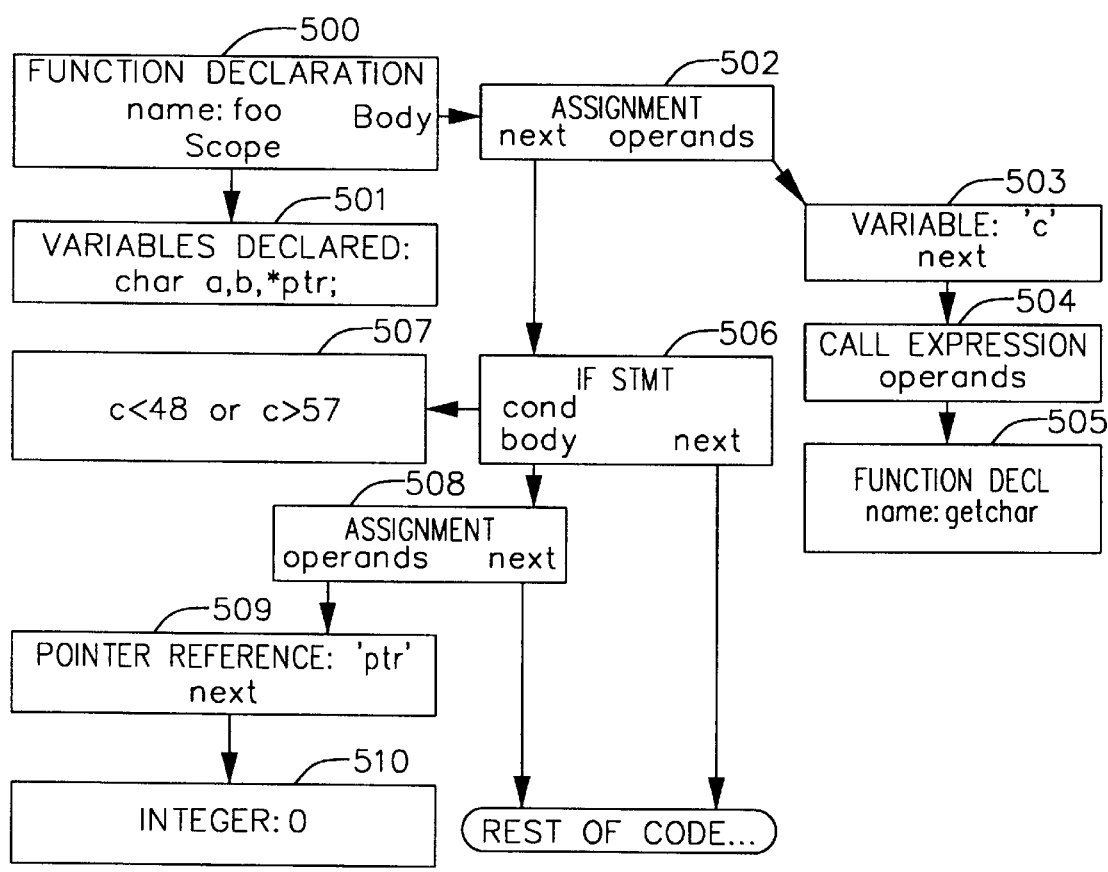
FIG. 32 is a diagram illustrating a parse tree representation of the source code listing shown in FIG. 31.

Referring to FIG. 32, a diagram illustrating a parse tree representation of the source code listing in FIG. 31 is shown. The function declaration (lines 1, 2 and 9) is represented by function declaration node 500. The declaration of variables "a" "b" and "ptr" (line 3) is represented by variables declared node 501. The assignment of the input character is represented by assignment node 502, which has two operands, a variable and a function call, represented respectively by nodes 503 and 504. The function call, represented by call expression node 504, has a single operand, function decl node 505 which contains the identifier for the "getchar( )" function. The conditional statement (line 5) is represented by if stmt node 506, which points to a node containing the conditions to be tested, represented by node 507. The body of the condition node contains an assignment statement (line 6) represented by assignment node 508, which has two operands, a pointer reference and an integer, respectively represented by nodes 509 and 510.

Figure 33:
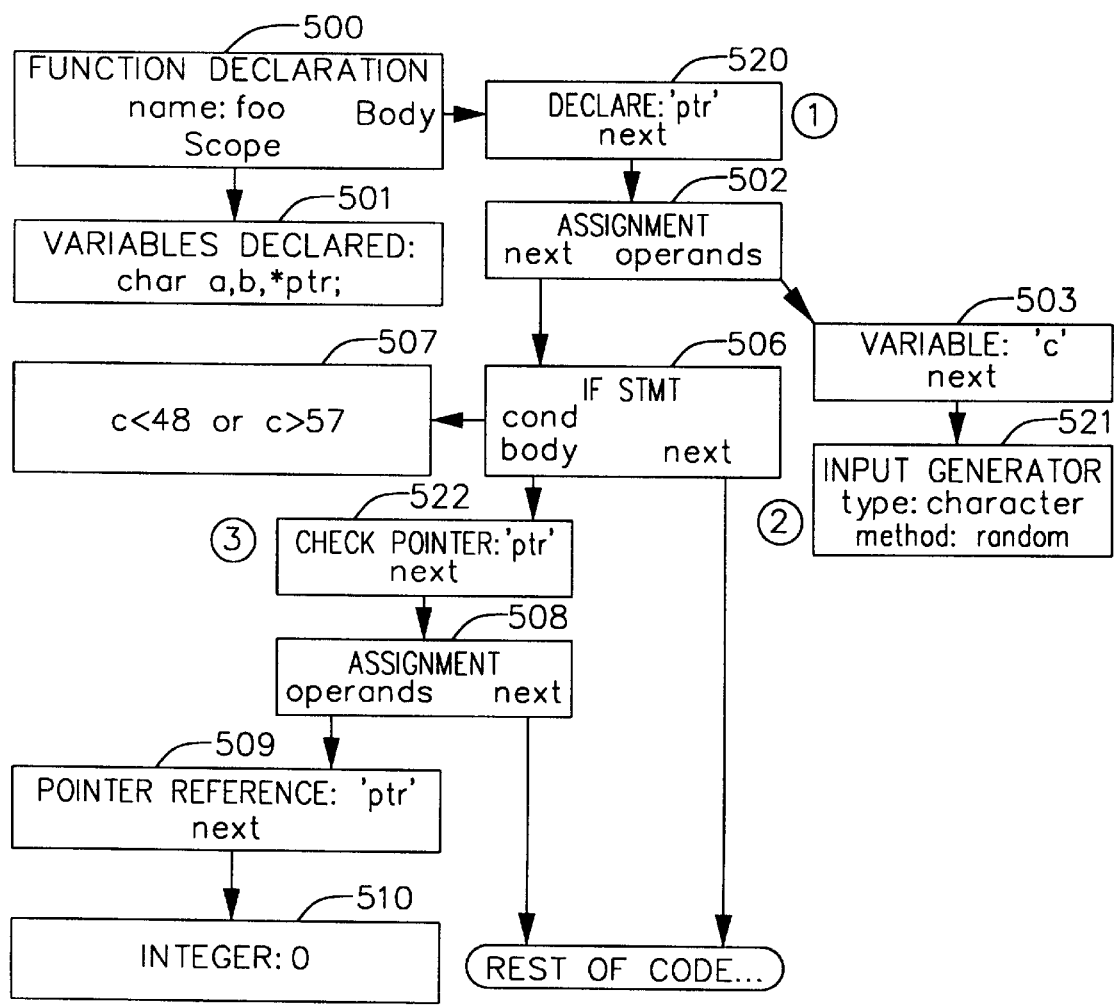
FIG. 33 is a diagram illustrating an instrumented parse tree representation of the source code listing shown in FIG. 31.

Referring to FIG. 33, a diagram illustrating an instrumented parse tree representation of the source code listing in FIG. 31 is shown. The instrumentation nodes for the declaration operation are inserted as declare node 520. The instrumentation nodes for the character input generation operation are inserted as input generator node 521. The instrumentation nodes for the uninitialized pointer check operation are inserted as check pointer node 522. Declare node 520 indicates to the error-checking engine that the local pointer memory variable "ptr" is declared and uninitialized. The input generator node 521 indicates to the error-checking engine that the function call to "getchar( )" is replaced by a test case generator function which generates random inputs between 0 and 255. The check pointer node 522 indicates to the error-checking engine that the function is attempting to use a pointer memory variable that may not have been initialized previously and is probably pointing to an invalid memory address.

As will be realized, the present invention is capable of other and different embodiments and its several details are capable of modifications in various respects, all without departing from the spirit and scope of the present invention. Accordingly, the drawings and detailed description of the preferred embodiment are to be regarded as illustrative in nature and not as restrictive.

What is claimed is:

1. A method using a computer for instrumenting in real time a computer program source code to facilitate the detection of runtime errors, the computer program being represented by a parse tree, each such runtime error having at least one instrumentation routine for communicating an occurence of the associated runtime error to an error-checking engine, each such instrumentation routine being represented by a parse tree fragment, comprising the steps of:

performing a real time flow analysis on the parse tree for the computer program to determine an appropriate instrumentation routine for detecting the runtime errors;

instrumenting in real time the parse tree for the computer program by grafting the parse tree fragment for each such instrumentation routine onto the parse tree for the computer program;

generating executable object code from the grafted parse tree containing references to the instrumentation routines; and executing the generated object code on a computer by transferring the runtime errors to the error-checking engine and linking the error-checking engine with the computer program to determine errors.

2. A method according to claim 1, wherein the runtime error comprises a read operation to an uninitialized memory variable, further comprising the steps of:

retrieving a memory address for a memory variable from a stack frame represented as interconnected nodes stored in the parse tree and augumenting the parse tree with the instrumentation nodes for indicating that the memory variable is possibly uninitialized;

identifying such a read operation to the memory address and augmenting the parse tree with the instrumentation nodes for indicating that the possibly uninitialized memory variable is being read by the read operation; and identifying a write operation to the memory address and augmenting the parse tree with the instrumentation nodes for indicating that the possibly uninitialized memory variable is initialized.

3. A method according to claim 1, wherein the runtime error comprises a write operation to an invalid memory address for a complex memory variable, further comprising the steps of:

identifying a declaration operation of the complex memory variable comprising an identifier operand and a dimension operand that defines a memory address range and augmenting the parse tree with the instrumentation nodes for storing the identifier operand and the dimension operand; and identifying such a write operation using the complex memory variable and augmenting the parse tree with instrumentation nodes for indicating an access by the write operation to at least one of such a memory address indentified by the indentifier operand that is invalid or such a memory address that falls outside of the memory address range defined by the dimension operand.

4. A method according to claim 1, wherein the runtime error comprises a runtime memory allocation operation using a pointer memory variable, further comprising the steps of:

identifying a declaration operation for such a pointer memory variable comprising an indentifier operand and augmenting the parse tree with instrumentation nodes for storing a pointer record for the pointer memory variable and a corresponding memory address;

identifying such a runtime memory allocation operation for allocating a memory block to the pointer memory variable and augmenting the parse tree with instrumentation nodes for storing an allocation record for the memory block indentified by the indentifier operand;

identifying an assignment operation assigning the corresponding memory address to the pointer memory variable and augmenting the parse tree with instrumentation nodes for storing the corresponding memory address into the pointer record; and augmenting the parse tree with instrumentation nodes for performing a runtime memory manipulation check using the pointer record and the allocation record.

5. A method according to claim 1, wherein the runtime error comprises an inappropriate use of a pointer memory variable, further comprising the steps of:

identifying a declaration operation for such a pointer memory variable and augmenting the parse tree with instrumentation nodes for storing a pointer record for the pointer memory variable and a corresponding memory address;

identifying an operation using the pointer memory variable and augmenting the parse tree with instrumentation nodes for indicating whether at least one of the operation is using the pointer memory variable when the corresponding memory address is equal to null, the operation is using the pointer memory variable when the corresponding memory address is unintialized, the operation is using the corresponding memory address not pointing to valid data, the operation is comparing the pointer memory variable not pointing to identical types of data or the operation is making a function call using the pointer memory variable not containing a valid function address.

6. A method according to claim 1, wherein the runtime error comprises a memory leak, further comprising the steps of:

identifying a declaration operation for a pointer memory variable and augmenting the parse tree with instrumentation nodes for storing a pointer record for the pointer memory variable; and identifying an exit from scope operation and augmenting the parse tree with instrumentation nodes for checking for memory leaks using the scope operation and the pointer record.

7. A system for instrumenting a computer program to facilitate the detection of runtime errors, the computer program being represented by a parse tree, each such runtime error having at least one instrumentation routine for communicating an occurrence of the associated runtime error to an error-checking engine, each such instrumentation routine being represented by a parse tree fragment, comprising:

means for performing a real time flow analysis on the parse tree for the computer program to determine an appropriate instrumentation routine for detecting the runtime errors;

means for instrumenting in real time the parse tree for the computer program by grafting the parse tree fragment for each such instrumentation routine onto the parse tree for the computer program;

means for generating executable object code from the grafted parse tree containing references to the instrumentation routines; and means for executing the generated object code by transferring the runtime errors to an error-checking engine and linking the error-checking engine with the computer program to determine errors.

8. A method using a computer for instrumenting an intermediate representation of a computer program for dynamic debugging, comprising the steps of:

creating in real time the intermediate representation of the computer program in the computer by translating source code comprising the computer program into an equivalent intermediate form;

analyzing in real time the intermediate representation of the computer program for instruction flow for determining an appropriate type of instrumentation for use in dynamic debugging;

augmenting in real time the intermediate representation of the computer program with at least one further intermediate representation wherein the at least one further intermediate representation comprises the appropriate type of instrumentation translated into the equivalent intermediate form;

generating executable object code from the augmented intermediate representation of the computer program containing references to the instrumentation routines and storing the executable code in the computer; and executing the executable object code by transferring runtime errors to an error-checking engine and linking the error-checking engine with the computer program to determine errors.

9. A method according to claim 8, wherein the step of creating the intermediate representation of the computer program further comprises the step of:

building a parse tree as the equivalent intermediate form.

10. A method according to claim 9, further comprising the steps of:

lexically analyzing the source code of the computer program to form a sequence of tokens;

parsing the sequence of tokens to form grammatical phrases;

semantically analyzing the grammatical phrases to form the parse tree.

11. A method according to claim 8, wherein the step of augmenting the intermediate representation of the computer program further comprises the steps of:

inserting such intermediate representations of instrumentation for checking functionality of the source code of the computer program and communicating the functionality to the error-checking engine; and inserting such intermediate representations of instrumentation for communicating non-functional information regarding the source code of the computer program to the error-checking engine.

12. A method according to claim 11, further comprising the steps of:

communicating at least one of a declaration of variables, pointer addresses and pointer sizes;

communicating assignments of pointers;

communicating at least one of function entry and exit point indicators; and communicating memory allocation indicators.

13. A method according to claim 11, further comprising the steps of:

detecting a read operation to an uninitialized memory variable;

detecting a write operation to an invalid memory address for a complex memory variable;

detecting a dynamic memory manipulation error using a pointer memory variable;

detecting an inappropriate use of a pointer memory variable;

detecting a memory leak error;

inserting a user-defined instrumentation routine; and inserting an automatic test case generation routine.

14. A method using a computer for instrumenting an intermediate representation of a computer program for dynamic debugging, comprising the steps of:

creating the intermediate representation of the computer program in the computer by translating source code comprising the computer program into an equivalent intermediate form consisting of at least an additional sequence of code instructions;

analyzing in real time the additional sequence of code instructions to determine an appropriate type of instrumentation for use in the dynamic debugging;

augmenting in real time the additional sequence of code instructions with further code instructions to invoke the appropriate type of instrumentation;

generating executable object code containing references to the instrumentation routines using the augmented sequence of additional code and storing the executable code in the computer, and executing the executable code by transferring runtime errors to an error-checking engine and linking the error-checking engine with the computer program to determine errors.

15. A method according to claim 14 wherein the appropriate type of instrumentation includes code directed to detecting a read operation to an uninitialized memory variable.

16. A method according to claim 14 wherein the appropriate type of instrumentation includes code directed to detecting a write operation to an invalid memory address for a complex memory variable.

17. A method according to claim 14 wherein the appropriate type of instrumentation includes code directed to detecting an inappropriate use of a pointer memory variable.

18. A method according to claim 14 wherein the appropriate type of instrumentation includes code directed to detecting dynamic memory manipulation error using a pointer memory variable.

19. A method according to claim 14 wherein the appropriate type of instrumentation includes code directed to detecting a memory leak error.

20. A method according to claim 14 wherein the appropriate type of instrumentation includes code corresponding to a user defined instrumentation routine.

21. A method according to claim 14 wherein the appropriate type of instrumentation includes code corresponding to an automatic test case generation routine.

22. A method using a computer for dynamic debugging, comprising the steps of:

initiating compilation of a computer program;

interrupting the compilation of a computer program in order to capture the intermediate representation of the computer program created by the compilation process;

augmenting in real time the intermediate representation of the computer program to add instrumentation for use in dynamic debugging;

reinitiating the compilation process to generate executable object code containing references to the instrumentation routines;

executing the object code by transferring runtime errors to an error-checking engine and linking the error-checking engine with the computer program to determine errors.

23. A method using a computer for instrumenting in real time a computer program source code to facilitate the detection of runtime errors, the computer program being represented by a parse tree, each such runtime error having at least one instrumentation routine for communicating an occurrence of the associated runtime error to an error-checking engine, each such instrumentation routine being represented by a parse tree fragment, comprising the steps of:

performing a real time flow analysis on the parse tree for the computer program to determine an appropriate instrumentation routine for detecting the runtime errors;

instrumenting in real time the parse tree for the computer program by grafting the parse tree fragment for each such instrumentation routine onto the parse tree for the computer program;

generating executable object code from the grafted parse tree containing references to the instrumentation routines; and continuously executing the generated object code on the computer by transferring runtime errors to an error-checking engine and linking the error-checking engine with the computer program to determine errors.

24. A method according to claim 23, wherein the runtime error comprises a read operation to an uninitialized memory variable, further comprising the steps of:

retrieving a memory address for a memory variable from a stack frame represented as interconnected nodes stored in the parse tree and augmenting the parse tree with the instrumentation nodes for indicating that the memory variable is possibly uninitialized;

identifying such a read operation to the memory address and augmenting the parse tree with the instrumentation nodes for indicating that the possibly uninitialized memory variable is being read by the read operation; and identifying a write operation to the memory address and augmenting the parse tree with the instrumentation nodes for indicating that the possibly uninitialized memory variable is initialized.

25. A method according to claim 23, wherein the runtime error comprises a write operation to an invalid memory address for a complex memory variable, further comprising the steps of:

identifying a declaration operation for the complex memory variable comprising an identifier operand and a dimension operand that defines a memory address range and augmenting the parse tree with the instrumentation nodes for storing the identifier operand and the dimension operand; and identifying such a write operation using the complex memory variable and augmenting the parse tree with instrumentation nodes for indicating an access by the write operation to at least one of such a memory address identified by the identifier operand that is invalid or such a memory address that falls outside of the memory address range defined by the dimension operand.

26. A method according to claim 23, wherein the runtime error comprises a runtime memory allocation operation using a pointer memory variable, further comprising the steps of:

identifying a declaration operation for such a pointer memory variable comprising a identifier operand and augmenting the parse tree with instrumentation nodes for storing a pointer record for the pointer memory variable and a corresponding memory address;

identifying such a runtime memory allocation operation for allocating a memory block to the pointer memory variable and augmenting the parse tree with instrumentation nodes for storing an allocation record for the memory block identified by the identifier operand;

identifying an assignment operation assigning the corresponding memory address to the pointer memory variable and augmenting the parse tree with instrumentation nodes for storing the corresponding memory address into the pointer record; and augmenting the parse tree with instrumentation nodes for performing a runtime memory manipulation check using the pointer record and the allocation record.

27. A method according to claim 23, wherein the runtime error comprises an inappropriate use of a pointer memory variable, further comprising the steps of:

identifying a declaration operation for such a pointer memory variable and augmenting the parse tree with instrumentation nodes for storing a pointer record for the pointer memory variable and a corresponding memory address;

identifying an operation using the pointer memory variable and augmenting the parse tree with instrumentation nodes for indicating whether at least one of the operation is using the pointer memory variable when the corresponding memory address is equal to null, the operation is using the pointer memory variable when the corresponding memory address is uninitialized, the operation is using the corresponding memory address not pointing to valid data, the operation is comparing the pointer memory variable not pointing to identical types of data or the operation is making a function call using the pointer memory variable not containing a valid function address.

28. A method according to claim 23, wherein the runtime error comprises a memory leak, further comprising the steps of:

identifying a declaration operation for a pointer memory variable and augmenting the parse tree with instrumentation nodes for storing a pointer record for the pointer memory variable; and identifying an exit from scope operation and augmenting the parse tree with instrumentation nodes for checking for memory leaks using the scope operation and the pointer record.

29. A system for instrumenting in real time a computer program source code to facilitate the detection of runtime errors, the computer program being represented by a parse tree, each such runtime error having at least one instrumentation routine for communicating an occurrence of the associated runtime error to an error-checking engine, each such instrumentation routine being represented by a parse tree fragments comprising:

means for performing a real time flow analysis on the parse tree for the computer program to determine an appropriate instrumentation routine for detecting the runtime errors;

means for instrumenting in real time the parse tree for the computer program by grafting the parse tree fragment for each such instrumentation routine onto the parse tree for the computer program;

means for generating executable object code from the grafted parse tree containing references to the instrumentation routines; and means for continuously executing the generated object code by transferring runtime errors to an error-checking engine and linking the error-checking engine with the computer program to determine errors.

30. A method using a computer for instrumenting in real time an intermediate representation of a computer program for dynamic debugging, comprising the steps of:

creating the intermediate representation of the computer program in the computer by translating source code comprising the computer program into an equivalent intermediate form;

analyzing in real time the intermediate representation of the computer program for instruction flow for determining an appropriate type of instrumentation for use in dynamic debugging;

augmenting in real time the intermediate representation of the computer program with at least one further intermediate representation wherein the at least one further intermediate representation comprises the appropriate type of instrumentation translated into the equivalent intermediate form;

generating executable object code containing references to the instrumentation routines from the augmented intermediate representation of the computer program and storing the executable code in the computer; and continuously executing the generated object code by transferring runtime errors to an error-checking engine and linking the error-checking engine with the computer program to determine errors.

31. A method according to claim 30, wherein the step of creating the intermediate representation of the computer program further comprises the step of:

building a parse tree as the equivalent intermediate form.

32. A method according to claim 31, further comprising the steps of:

lexically analyzing the source code of the computer program to form a sequence of tokens;

parsing the sequence of tokens to form grammatical phrases;

semantically analyzing the grammatical phrases to form the parse tree.

33. A method according to claim 30, wherein the step of augmenting the intermediate representation of the computer program further comprises the steps of:

inserting such intermediate representations of instrumentation for checking functionality of the source code of the computer program and communicating the functionality to the error-checking engine; and inserting such intermediate representations of instrumentation for communicating non-functional information regarding the source code of the computer program to the error-checking engine.

34. A method according to claim 33, further comprising the steps of:

communicating at least one of a declaration of variables, pointer addresses and pointer sizes;

communicating assignments of pointers;

communicating at least one of function entry and exit point indicators; and communicating memory allocation indicators.

35. A method according to claim 33, further comprising the steps of:

detecting a read operation to an uninitialized memory variable;

detecting a write operation to an invalid memory address for a complex memory variable;

detecting a dynamic memory manipulation error using a pointer memory variable;

detecting an inappropriate use of a pointer memory variable;

detecting a memory leak error;

inserting a user-defined instrumentation routine; and inserting an automatic test case generation routine.

36. A method using a computer for instrumenting in real time an intermediate representation of a computer program source code for dynamic debugging, comprising the steps of:

creating the intermediate representation of the computer program in the computer by translating source code comprising the computer program into an equivalent intermediate form consisting of at least an additional sequence of code instructions;

analyzing in real time the additional sequence of code instructions to determine an appropriate type of instrumentation for use in the dynamic debugging;

augmenting in real time the additional sequence of code instructions with further code instructions to invoke the appropriate type of instrumentation;

generating executable object code containing references to the instrumentation routines using the augmented sequence of additional code and storing the executable code in the computer; and continuously executing the executable code by transferring runtime errors to an error-checking engine and linking the error-checking engine with the computer program to determine errors.

37. A method according to claim 36 wherein the appropriate type of instrumentation includes code directed to detecting a read operation to an uninitialized memory variable.

38. A method according to claim 36 wherein the appropriate type of instrumentation includes code directed to detecting a write operation to an invalid memory address for a complex memory variable.

39. A method according to claim 36 wherein the appropriate type of instrumentation includes code directed to detecting an inappropriate use of a pointer memory variable.

40. A method according to claim 36 wherein the appropriate type of instrumentation includes code directed to detecting dynamic memory manipulation error using a pointer memory variable.

41. A method according to claim 36 wherein the appropriate type of instrumentation includes code directed to detecting a memory leak error.

42. A method according to claim 36 wherein the appropriate type of instrumentation includes code corresponding to a user defined instrumentation routine.

43. A method according to claim 36 wherein the appropriate type of instrumentation includes code corresponding to an automatic test case generation routine.

44. A method using a computer for dynamic debugging, comprising the steps of:

initiating compilation of a computer program;

interrupting the compilation of a computer program in order to capture the intermediate representation of the computer program created by the compilation process;

augmenting in real time the intermediate representation of the computer program to add instrumentation for use in dynamic debugging;

reinitiating the compilation process to generate executable object code containing references to the instrumentation routines;

continuously executing the object code by transferring runtime errors to an error-checking engine and linking the error-checking engine with the computer program to determine errors.

45. A method using a computer for instrumenting an intermediate representation of a computer program for dynamic debugging, comprising the steps of:

creating the intermediate representation of the computer program in the computer by translating source code comprising the computer program into an equivalent intermediate form;

analyzing in real time the intermediate representation of the computer program for instruction flow for determining an appropriate type of instrumentation for use in dynamic debugging;

augmenting in real time the intermediate representation of the computer program with at least one further intermediate representation wherein the at least one further intermediate representation comprises the appropriate type of instrumentation translated into the equivalent intermediate form;

generating executable object code containing references to the instrumentation routines from the augmented intermediate representation of the computer program and storing the executable code in the computer; and executing the code executable in real time by transferring runtime errors to an error-checking engine and linking the error-checking engine with the computer program to determine errors.

46. A method according to claim 45, wherein the step of creating the intermediate representation of the computer program further comprises the step of:

building a parse tree as the equivalent intermediate form.

47. A method according to claim 46, further comprising the steps of:

lexically analyzing the source code of the computer program to form a sequence of tokens;

parsing the sequence of tokens to form grammatical phrases;

semantically analyzing the grammatical phrases to form the parse tree.

48. A method according to claim 45, wherein the step of augmenting the intermediate representation of the computer program further comprises the steps of:

inserting such intermediate representations of instrumentation for checking functionality of the source code of the computer program and communicating the functionality to the error-checking engine; and inserting such intermediate representations of instrumentation for communicating non-functional information regarding the source code of the computer program to the error-checking engine.

49. A method according to claim 48, further comprising the steps of:

communicating at least one of a declaration of variables, pointer addresses and pointer sizes;

communicating assignments of pointers;

communicating at least one of function entry and exit point indicators; and communicating memory allocation indicators.

50. A method according to claim 48, further comprising the steps of:

detecting a read operation to an uninitialized memory variable;

detecting a write operation to an invalid memory address for a complex memory variable;

detecting a dynamic memory manipulation error using a pointer memory variable;

detecting an inappropriate use of a pointer memory variable;

detecting a memory leak error;

inserting a user-defined instrumentation routine; and inserting an automatic test case generation routine.

* * * * *